United States Patent
Nasser et al.

(10) Patent No.: US 12,028,210 B2
(45) Date of Patent: Jul. 2, 2024

(54) PRODUCTION SOFTWARE APPLICATION PERFORMANCE AND RESILIENCY TESTING

(71) Applicant: International Business Machines Corporation, Armonk, NY (US)

(72) Inventors: Samir Nasser, Durham, NC (US); Kyle Brown, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 16/689,472

(22) Filed: Nov. 20, 2019

(65) Prior Publication Data

US 2020/0092168 A1    Mar. 19, 2020

Related U.S. Application Data

(63) Continuation of application No. 15/869,731, filed on Jan. 12, 2018, now Pat. No. 10,567,227.

(51) Int. Cl.
*G06F 16/00*     (2019.01)
*G06F 16/21*     (2019.01)
*H04L 41/046*    (2022.01)
*H04L 41/08*     (2022.01)
*H04L 41/0823*   (2022.01)
*H04L 41/14*     (2022.01)
(Continued)

(52) U.S. Cl.
CPC ......... *H04L 41/0823* (2013.01); *G06F 16/00* (2019.01); *G06F 16/217* (2019.01); *H04L 41/046* (2013.01); *H04L 41/0876* (2013.01); *H04L 41/145* (2013.01); *H04L 41/5032* (2013.01); *H04L 43/55* (2022.05)

(58) Field of Classification Search
CPC ..................................................... G06F 16/217
See application file for complete search history.

(56) References Cited

U.S. PATENT DOCUMENTS 8,051,163 B2   11/2011   Ruiz et al.
8,935,794 B2    1/2015   Brake et al.
(Continued)

OTHER PUBLICATIONS

Marri et al. "An Empirical Study of Testing File-System-Dependent Software with Mock Objects" ICSE Workshop on Automation of Software T est. Vancouver, BC, Canada, DOI: 10.1109/IWAST. 2009.5069054. 2009.

(Continued)

*Primary Examiner* — Ajith Jacob
(74) *Attorney, Agent, or Firm* — Elliot J. Shine; HESLIN, ROTHENBERG, FARLEY & MESITI, P.C.; George S. Blasiak, Esq.

(57) ABSTRACT

Methods, computer program products, and systems are presented. The method computer program products, and systems can include, for instance: marking of a request to define a marked request that includes associated metadata, wherein the metadata specifies action for performing by a resource interface associated to a production environment resource of a production environment, wherein the resource interface is configured for emulating functionality of the production environment resource; and sending the marked request to the resource interface for performance of the action specified by the metadata.

20 Claims, 13 Drawing Sheets

(51) Int. Cl.
*H04L 41/50* (2022.01)
*H04L 43/55* (2022.01)

(56) References Cited

U.S. PATENT DOCUMENTS

| | | | |
|---|---|---|---|
| 9,462,010 | B1 | 10/2016 | Stevenson |
| 9,571,517 | B2 | 2/2017 | Vallone et al. |
| 9,665,885 | B1 | 5/2017 | Allouche |
| 2013/0346987 | A1* | 12/2013 | Raney .................. G06F 9/5044 718/102 |
| 2015/0135158 | A1 | 5/2015 | Tenev et al. |
| 2016/0001187 | A1 | 1/2016 | Sepulveda et al. |

OTHER PUBLICATIONS

Taneja et al. "MODA: Automated Test Generation for Database Applications via Mock Objects" Proceedings of the IEEE/ACM international Conference on Automated Software Engineering. Antwerp, Belgium. Sep. 2010.

Notice of Allowance for U.S. Appl. No. 15/869,731, dated Oct. 8, 2019.

P. Mell, et al. "*The NIST Definition of Cloud Computing*", NIST Special Publication 800-145, Sep. 2011, Gaithersburg, MD.

List of IBM Patent and/or Patent Applications treated as related for U.S. Appl. No. 15/869,731, filed Jan. 12, 2018, dated Dec. 9, 2019.

\* cited by examiner

PRODUCTION SOFTWARE APPLICATION PERFORMANCE AND RESILIENCY TESTING

CROSS-REFERENCE TO RELATED APPLICATION

This application is a continuation of U.S. patent application Ser. No. 15/869,731, filed Jan. 12, 2018, entitled, "Production Software Application Performance And Resiliency Testing", the entirety of which is hereby incorporated herein by reference.

BACKGROUND

Regular upgrades to computer systems are critical to survival and success of an enterprise. Upgrades can include upgrades in software and infrastructure. While upgrades are critical, incorporating updates imposes risk. In some cases, an upgrade can be incompatible with un-upgraded features of a computer system. Therefore, users of computer systems may avoid implementing upgrades in order to assure system stability.

A distributed software solution serving some business functions will, sooner or later, fail because of a variety of reasons. When failure happens, a series of activities is usually followed to prevent the failure from happening again. The drawback with this approach is that a failure must happen first, which could result in some undesirable effects such as a financial loss or customer complaints. Efforts followed to identify and test every possible failure scenario in a test environment usually fall short. This is because a test environment is often different from the corresponding production environment.

Chaos and latency monkeys have been used to address failures production environment. The idea behind the chaos and latency monkeys is to actually inject a failure in the production environment by shutting or slowing down a service during business hours, not holidays or weekends. One problem with such an approach is that is that the production requests and possibly service level agreements can actually be impacted in a negative way.

SUMMARY

Shortcomings of the prior art are overcome, and additional advantages are provided, through the provision, in one aspect, of a method. The method can include, for example: receiving, by a database resource interface, a synthetic request to access a database resource; determining by machine logic rules of the database resource interface that the request has been synthetically generated by a generating device and is not a live production request; and responsive to the determination that the request has been synthetically generated sending, by the database resource interface, a responsive report to the generating device without accessing the database resource.

In another aspect, a computer program product can be provided. The computer program product can include a computer readable storage medium readable by one or more processing circuit and storing instructions for execution by one or more processor for performing a method. The method can include, for example: receiving, by a database resource interface, a synthetic request to access a database resource; determining by machine logic rules of the database resource interface that the request has been synthetically generated by a generating device and is not a live production request; and responsive to the determination that the request has been synthetically generated sending, by the database resource interface, a responsive report to the generating device without accessing the database resource.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a database resource interface, a synthetic request to access a database resource; determining by machine logic rules of the database resource interface that the request has been synthetically generated by a generating device and is not a live production request; and responsive to the determination that the request has been synthetically generated sending, by the database resource interface, a responsive report to the generating device without accessing the database resource.

Shortcomings of the prior art are overcome, and additional advantages are provided, through the provision, in one aspect, of a method. The method can include, for example: receiving, by a database resource interface, a synthetic request to access a database resource; determining, by machine logic rules of the database resource interface, that the request has been synthetically generated by a generating device and is not a live production request; responsive to the determination that the request has been synthetically generated modifying, by the database resource interface, the synthetic request to generate a modified request; and sending, by the database resource interface, the modified request to the database resource.

In another aspect, a computer program product can be provided. The computer program product can include a computer readable storage medium readable by one or more processing circuit and storing instructions for execution by one or more processor for performing a method. The method can include, for example: receiving, by a database resource interface, a synthetic request to access a database resource; determining, by machine logic rules of the database resource interface, that the request has been synthetically generated by a generating device and is not a live production request; responsive to the determination that the request has been synthetically generated modifying, by the database resource interface, the synthetic request to generate a modified request; and sending, by the database resource interface, the modified request to the database resource.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a database resource interface, a synthetic request to access a database resource; determining, by machine logic rules of the database resource interface, that the request has been synthetically generated by a generating device and is not a live production request; responsive to the determination that the request has been synthetically generated modifying, by the database resource interface, the synthetic request to generate a modified request; and sending, by the database resource interface, the modified request to the database resource.

Shortcomings of the prior art are overcome, and additional advantages are provided, through the provision, in one aspect, of a method. The method can include, for example: receiving, by a resource interface, a synthetic request to access a production environment resource; determining by machine logic rules of the resource interface that the request has been synthetically generated by a generating device and is not a live production request; and responsive to the determination that the request has been synthetically generated sending, by the resource interface, a responsive report to the generating device without accessing the production environment resource.

In another aspect, a computer program product can be provided. The computer program product can include a computer readable storage medium readable by one or more processing circuit and storing instructions for execution by one or more processor for performing a method. The method can include, for example: receiving, by a resource interface, a synthetic request to access a production environment resource; determining by machine logic rules of the resource interface that the request has been synthetically generated by a generating device and is not a live production request; and responsive to the determination that the request has been synthetically generated sending, by the resource interface, a responsive report to the generating device without accessing the production environment resource.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a resource interface, a synthetic request to access a production environment resource; determining by machine logic rules of the resource interface that the request has been synthetically generated by a generating device and is not a live production request; and responsive to the determination that the request has been synthetically generated sending, by the resource interface, a responsive report to the generating device without accessing the production environment resource.

Shortcomings of the prior art are overcome, and additional advantages are provided, through the provision, in one aspect, of a method. The method can include, for example: receiving, by a resource interface, a synthetic request to access a production environment resource; determining, by machine logic rules of the resource interface, that the request has been synthetically generated by a generating device and is not a live production request; responsive to the determination that the request has been synthetically generated modifying, by the resource interface, the synthetic request to generate a modified request; and sending, by the resource interface, the modified request to the production environment resource.

In another aspect, a computer program product can be provided. The computer program product can include a computer readable storage medium readable by one or more processing circuit and storing instructions for execution by one or more processor for performing a method. The method can include, for example: receiving, by a resource interface, a synthetic request to access a production environment resource; determining, by machine logic rules of the resource interface, that the request has been synthetically generated by a generating device and is not a live production request; responsive to the determination that the request has been synthetically generated modifying, by the resource interface, the synthetic request to generate a modified request; and sending, by the resource interface, the modified request to the production environment resource.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a resource interface, a synthetic request to access a production environment resource; determining, by machine logic rules of the resource interface, that the request has been synthetically generated by a generating device and is not a live production request; responsive to the determination that the request has been synthetically generated modifying, by the resource interface, the synthetic request to generate a modified request; and sending, by the resource interface, the modified request to the production environment resource.

Shortcomings of the prior art are overcome, and additional advantages are provided, through the provision, in one aspect, of a method. The method can include, for example: marking of a request to define a marked request that includes metadata, wherein the metadata specifies action for performing by a resource interface associated to a production environment resource of a production environment, wherein the resource interface is configured for emulating functionality of the production environment resource; and sending the marked request to the resource interface for performance of the action specified by the metadata.

In another aspect, a computer program product can be provided. The computer program product can include a computer readable storage medium readable by one or more processing circuit and storing instructions for execution by one or more processor for performing a method. The method can include, for example: marking of a request to define a marked request that includes associated metadata, wherein the metadata specifies action for performing by a resource interface associated to a production environment resource of a production environment, wherein the resource interface is configured for emulating functionality of the production environment resource; and sending the marked request to the resource interface for performance of the action specified by the metadata.

Shortcomings of the prior art are overcome, and additional advantages are provided, through the provision, in one aspect, of a method. The method can include, for example: receiving at a resource interface a request, the request being a marked request having metadata that specifies action for the resource interface, wherein the resource interface is associated to a production environment resource, and wherein the resource interface is configured for emulating functionality of its associated resource interface; and performing the action specified in the metadata.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
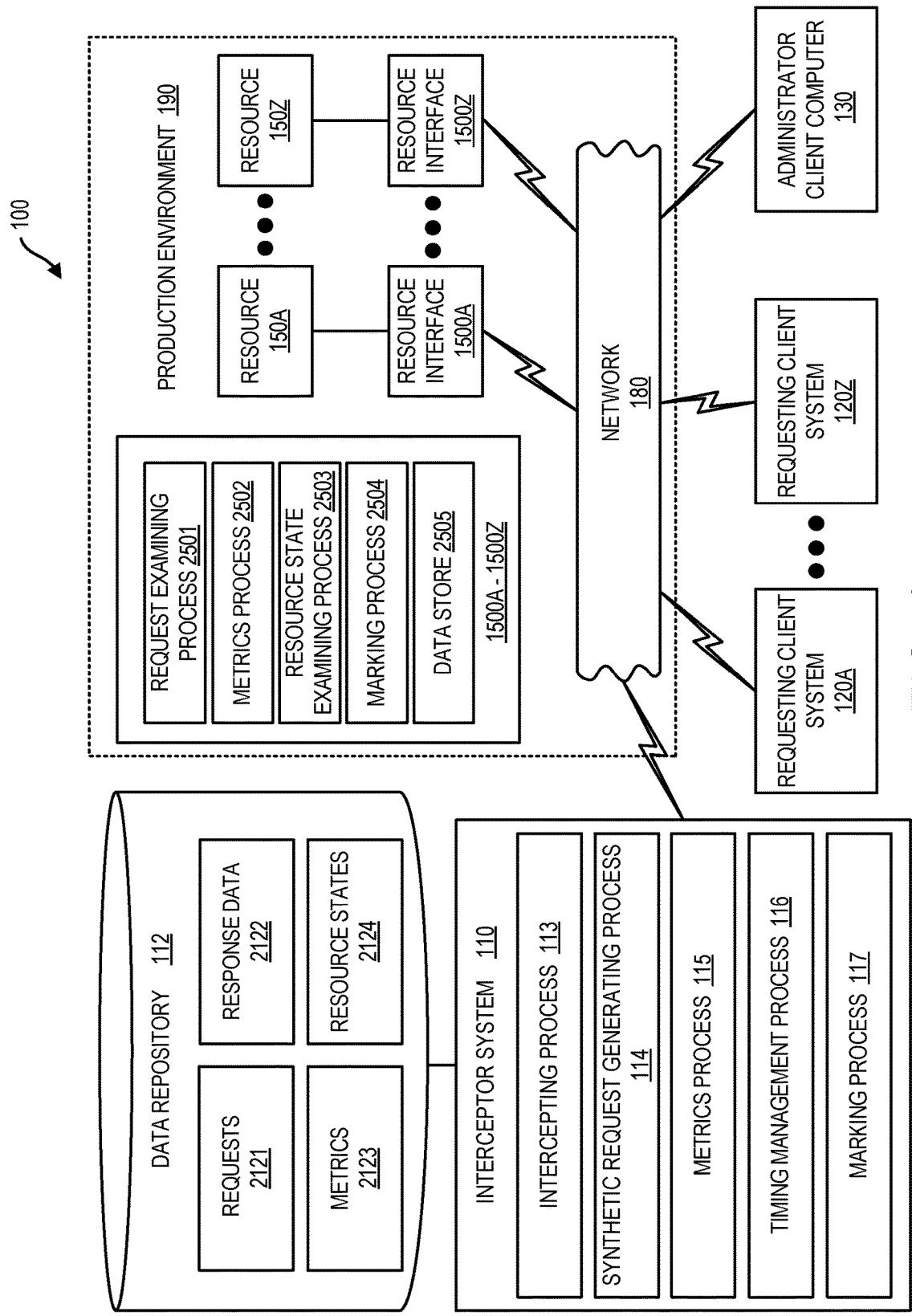
FIG. 1 is a schematic diagram depicting a system having an interceptor system and a production environment having resources that include associated resource interfaces in one embodiment.

FIG. 1 is a block diagram of system 100, in accordance with one embodiment as set forth herein. In the embodiment of FIG. 1, system 100 can include numerous devices such as computing node based devices connected by a network 180. For example, network 180 may include a physical network and/or a virtual network. A physical network can be for example, a physical telecommunications network connection numerous computing nodes or systems, such as computer servers and computer clients. By contrast, a virtual network can for example, combine numerous physical networks or parts thereof into a logical virtual network.

By way of explanation, FIG. 1 depicts an example system. In one embodiment, system 100 can include interceptor system 110 having an associated data repository 112, requesting client systems 120A-120Z, administrator client computer 130, resources 150A-150Z each having an associated resource interface 1500A-1500Z. A production environment 190 of system 100 can include in one embodiment, live production environment resources 150A-150C, resource interfaces 1500A-1500Z associated with their respective live production environment resources 150A-150Z, and network 180. Interceptor system 110 can be configured to run various processes. Processes which interceptor system 110 can be configured to run can include in one embodiment, an intercepting process 113, a synthetic request generating process 114, a metrics process 115, a timing management process 116, and a marking process 117. Synthetic request generating process 114 can define interceptor system 110 as a generating device.

Embodiments herein provide for testing of production environment 190 which can include resources 150A-150Z each of which can have an associated resource interface 1500A-1500Z. Resources of resources 150A-150Z can include one or more resource. Resources of resources 150A-150Z can include e.g. one or more language translator resource, one or more messaging service (e.g. a message queue (MQ) resource), one or more enterprise service bus resource, one or more enterprise planning resource (EPR), one or more customer relations management resource (CRM), one or more lightweight directory access protocol (LDAP) resource, one or more relational database resource, one or more non-relational database resource, and/or one or more objects storage resource, or any combination of such resource types or other resource types. There is set forth herein in one embodiment an apparatus that intercepts requests in the production environment for later replay with or without modification. Additionally, each resource can be fronted with a resource interface that according to one configuration can subject live production requests to pass-through forwarding for execution by an associated resource but which can process synthetic requests and live production request in specific ways to support testing.

Data repository 112 of interceptor system 110 can store various data. In requests area 2121 of data repository 112, data repository 112 can store a history log of live production requests and synthetic requests to production environment 190. In response data area 2122 data repository 112 can store a history of response data received responsively to requests sent to production environment 190. Response data can include (a) response data provided by resource interfaces by emulation of an associated resource and/or (b) response data provided by resources. In metrics area 2123 data repository 112 can store metrics data determined by processing of response data. In resource states area 2124, data repository 112 can store data specifying the current and historical states of resources of production environment 190. In one embodiment, a resource can have an active state or an inactive state. In an inactive state, a resource by default can respond to a request by emulation rather than execution. For emulating a response in one embodiment, a resource interface associated to a certain resource can trap and receive a request to the certain resource and provide a response that emulates the response provided had the certain resource executed the request.

Regarding intercepting process 113, interceptor system 110 can run intercepting process 113 to intercept live production requests applied to production environment 190 by one or more client system of requesting client systems 120A-120Z. System 100 can be configured in one embodiment, so that each live production request of production environment 190, made by a requesting client system of requesting client systems 120A-120Z, is intercepted by interceptor system 110 for processing by intercepting process 113. Processing performed by intercepting process 113 can including sending data of a received live production request to data repository 112 for storage in live request area 2121 so that data repository 112 maintains a history log of live production requests received by system 100. Processing performed by intercepting process 113 can also include sending by forwarding received live production requests to production environment 190 for receipt and processing by one or more resource interface and in certain instances one or more resource of production environment 190.

Synthetic request generating process 114 run by interceptor system 110 can output synthetic requests based on synthetic request configuration data defined by an administrator user using an administrator user interface.

Interceptor system 110 can run metrics process 115, to determine metrics of response data returned to interceptor system 110 from a resource interface. Metrics process 115 can be run to determine metrics of emulated response data from resource interfaces and live production response data from resources. Determined metrics data can include, e.g. one or more of data on busy and idle threads, bandwidth consumption, throughput, timing including response time, load distribution, memory use, I/O and the like.

Interceptor system 110 can run timing management process 116 to manage timing operations of system 100. Based on received administrator user defined configuration data, timing management process 116 can perform various timing management operations. Examples of timing management operations performed by timing management process 116 can include for example, concurrently sending live production requests and generated synthetic requests to production environment 190 and enabling resources of a plurality of resources 150A-150Z to receive synthetic requests only at select times in the operation of production environment 190, e.g. at non-peak operating times.

Interceptor system 110 can run marking process 117 to mark requests that are sent by interceptor system 110. Marking operations performed by marking process 117, can include e.g. appropriately marking a live production request with metadata to output a marked live production request and appropriately marking a synthetic request with metadata to output a marked synthetic request.

Marking performed by marking process 117 can include marking with metadata to specify, e.g. a resource interface identifier, an action to be performed by a resource interface, a type of request (live production or synthetic), and a serial number for the request. Interceptor system 110 running marking process 117 can mark requests with action metadata that specifies how resource identifiers are to behave. An example of metadata is set forth in (1) below:

$$\text{serialnumber="<request-number>", resource}$$
$$\text{interface="<resource-resourceinterface>",}$$
$$\text{<resource-resourceinterface>-action="<do>",}$$
$$\text{type="<request-type>"} \quad (1)$$

Where <request-number> specifies a serial number for a request that can be assigned by interceptor system 110 running marking process 117, <resource-resourceinterface> represents a resource interface of a resource, <do> is what the interceptor system 110 tells a resource interface to do, and <request-type> specifies the type of request (live production or synthetic).

Example values of <do> (actions) are as follows: "do-nothing", "sample", "delay=5 s", "speed=300 ms". <request-type> can have two values: live or synthetic. There can be many combinations of values of such parameters. For example, serialnumber='00*', resource interface="DB2", DB2-action="sample", DB2-action="storesample", type="synthetic" tells the DB2 resource interface to sample and store synthetic traffic on a data store of the resource interface. That means the DB2 resource interface sends a synthetic request to its associated resource DB2 and stores the request and corresponding response from the resource. Another example metadata is, serialnumber='00*', resource interface="*", action="sample", action="storesample", type="synthetic". Here, the interceptor system 110 tells all resource interfaces 1500A-1500Z to send synthetic requests to their respective resources 150A-150B and sample the synthetic traffic for storage on data stores of the respective resource interfaces 1500A-1500Z. Metadata can be resource agnostic. A summary of actions that can be performed by a resource interfaces based on an action field of tagged metadata of a received request are summarized in Table A.

TABLE A

| Summary of Actions | |
|---|---|
| <do> (action) | Description |
| "do-nothing" | A resource interface performing this action will timeout without performing emulating or sampling. |
| "emulate" | A resource interface performing this action will emulate a response of the resource |

TABLE A-continued

| Summary of Actions | |
|---|---|
| <do> (action) | Description |
| "execute" | A resource interface performing this action will passthrough forward the request for execution to its associated resource |
| "sample" | A resource interface performing this action will passthrough forward the request for execution to its associated resource and receive a request response from its associated resource |
| 'metric' | A resource interface performing this action will process a response (from emulation or sampled from a resource) to generate metrics |
| "storesample" | A resource interface performing this action will store a sampled response from its associated resource on a data store of the resource interface |
| "responsesend" | A resource interface performing this action will send a response (from emulation or sampled from a resource) and any associated generated metrics data to a data repository of the interceptor system |
| "delay = Tms", | A resource interface performing this action will perform a specified action after a delay of Tms |
| "speed = Tms" | A resource interface performing this action will complete a specified action within a time period of Tms |

Interceptor system 110 can perform a variety of functions including such functions e.g. as sampling live production requests and storing them in an area of data repository 112 (such as an in-memory data store or database), providing the ability to change request data, request throughput or other metrics, and/or mix. Interceptor system 110 can receive configuration data entered by an administrator user using a user interface such as a web based user interface. While sampling live production requests, the interceptor system 110 can concurrently route synthetic requests through the production environment 190. A part of production environment 190 may be exclusively dedicated temporarily for certain time periods for synthetic request processing for certain test cases. Interceptor system 110 can mark requests (live production or synthetic) in a manner to facilitate processing by one or more resource interface 1500A-1500Z. Interceptor system 110 can identify whether a response is a live production request response or synthetic request response, and can inform resource interfaces which requests and responses to sample.

Further details of production environment 190 which can be configured for use as test environment is now described. According to system 100, each resource 150A-150Z can have an associated resource interface 1500A-1500Z, which provides functionality (unless a test plan is configured differently) so that live production requests received by production environment 190 are appropriately processed as live production requests, and further so that synthetic requests received by production environment 190 are appropriately processed as synthetic requests. Each resource interface 1500A-1500Z can be associated to a resource 150A-150Z of production environment 190. In one embodiment, there can be one-to-one association between resource interfaces 1500A -1500Z and resources 150A-150Z. That is, resource interface 1500A can be associated to resource 150A, resource interface 1500B can be associated to resource 150B, and so on.

Embodiments herein recognize shortcomings associated with currently available methods for testing software, typically involving use of a test environment provided by a shadow environment. According to the current state of the art, the common approach for testing software is to establish a shadow environment having infrastructure external to infrastructure defining the production environment and to deploy synthetic requests to the shadow environment. However, embodiments herein recognize that these efforts fall short because, in part, the test environment tends to exhibit a high degree of dissimilarity from the corresponding production environment. Embodiments herein involve the use of production environment 190 as a test environment. In one aspect, both live production requests and synthetic requests can be processed within production environment 190 concurrently. In one embodiment, both live production requests and synthetic requests can be transmitted through common infrastructure of production environment 190.

In one embodiment, a resource interface that can be provided on a certain computing node can both (a) process synthetic requests by emulating operation of an associated certain resource and (b) passthrough forward live production requests for execution by the certain resource.

In one embodiment, a resource interface and its associated resource can be provided on a common computing node. In one embodiment, a resource interface and its associated resource can be provided on separate computing nodes. In one embodiment, a resource interface and its associated resource can be provided in a common cluster. In one embodiment, a resource interface and its associated resource can be provided in a common data center. In one embodiment, a resource interface and its associated resource can be provided by a common virtual machine (VM). While various addressing schemes are possible, in one embodiment, a resource interface and its associated resource can share a common IP address, and a resource can be addressed by addressing its associated resource interface.

In another aspect, resources 150A-150Z can be configured to handle both live production requests and synthetic requests. Requests (live production or synthetic) passing through a production environment can be responded to by a combination of production resources and resource interfaces. For example, a first resource interface/resource can perform passthrough forwarding of a request for execution by a resource and a second resource interface/resource can perform emulation of a resource by a resource interface without passthrough forwarding a request by a resource interface to an associated resource. Thus, based on a variety of features, system 100 is able to produce results that more accurately reflect the deployment of new software or other change to a production environment.

Resource interfaces 1500A-1500Z, each having an associated resource 150A-150Z, can be configured to perform a variety of functions. Functions performed by each resource interface 1500A-1500Z can include passthrough forwarding of a received live production request to an associated resource and on the receipt of a synthetic request, and processing the synthetic request in a manner that emulates operation of an associated resource. In one embodiment, production environment 190 can be configured so that each resource of a plurality of resources 150A-150Z has an associated resource interface 1500A-1500Z. In one embodiment, system 100 can be configured so that each request, e.g. live production request or synthetic request destined for processing by a certain resource of resources 150A-150Z is received and processed initially by the resource interface associated to the certain resource. In one embodiment, resource interfaces 1500A-1500Z can trap all requests to their respective resources 150A-150Z.

In one embodiment, each resource interface of resource interfaces 1500A-1500Z can run a request examining process 2501, a metrics process 2502, a mode examining process 2503, and a marking process 2504. A resource interface can run request examining process 2501 to examine received data requests, including received live production requests and received synthetic requests Running request examining process 2501, a resource interface can examine metadata associated with the received request. Based on the metadata, request examining process 2501 can determine that a received request is a live production request or a synthetic request. Metadata of received requests in some embodiments can specify action to be performed by a resource interface Running request examining process 2501, a resource interface can determine an operation that is specified by a marking with a received request and can perform the specified operation. Processes 2501-2504 of resource interfaces 1500A-1500Z can define machine logic rules of resource interfaces 1500A-1500B, and processes 113-117 of resources 150A-150Z can define machine logic rules of interceptor system 110.

A resource interface can run metrics process 2502 to determine metrics of emulated response data from resource interfaces and response data from live production resources.

A resource interface can run mode examining process 2503. In some embodiments, an administrator can configure the state of each resource. In some instances, a state of each resource can be in dependence on an automated process. Each resource of resources 150A-150Z can have an active state and an inactive state. In an active state, the resource can be enabled to respond to live production requests and synthetic requests. In an inactive state, a resource can be restricted from responding to live production requests and synthetic requests. In the case that a state of a resource is the inactive state, a resource interface associated with the certain resource can respond to requests in place of the certain resource in a manner to emulate the operation of the certain resource. A resource interface can run resource state examining process 2503 to determine whether the resource associated to a certain resource interface is in an active or inactive state. States of resources can be stored in resource states area 2124 of data repository 112. Resource states area 2124 of data repository 112 for determining whether the state of the certain resource associated to the certain resource interface is active or inactive.

A resource interface can run marking process 2504 to mark a through request that continues through a certain resource interface and/or its associated resource. A request received at a certain resource interface or its associated resource can terminate or alternatively continue through to another resource interface of production environment 190. Marking process 2504 provides marking of outgoing through request data of a through request that continues through a resource interface and/or resource so that a next resource handling the request handles the request correctly in accordance with configuration data of a test plan. Marking process 2504 can be run, e.g., to mark a through request with (a) the serial number or the request that is provided by a through request (b) a resource identifier associated to a resource interface that will receive the through request, (c) one or more action for performance by the receiving resource interface and (d) type (live or synthetic). The resource interface associated with the destination resource can examine the markings specified by marking process 2504 for performance of appropriate processing of the through request. A through request can continue through any arbitrary number of resource interfaces and/or resource of production environment 190 until it terminates.

Each resource interface 1500A-1500Z can also include a data store 2505. Data store 2505 can store e.g. a serial number for an incoming request for later tagging to response data generated by emulation at the resource interface or by the production resource associated to the resource interface. A data store of a certain resource interface can also store response data generated by the response of the certain resource interface. Such stored response data can be used by the certain resource interface to emulate functionality of the certain resource.

Each resource of resource interface 1500A-1500Z can perform a variety of functions including passthrough forwarding of live production requests, sampling live production requests and corresponding responses, storing requests, storing responses, and performance metrics such as throughput and response times, mapping responses to requests, simulating various levels of performance and resiliency of its actual resource, identifying whether a request is live or synthetic, marking synthetic requests and responses for downstream components which may be other resource interfaces of resource interface 1500A-1500Z, actual resources or interceptor system 110. Each resource of resource interface 1500A-1500Z can be configured to treat synthetic requests as live production requests by passthrough forwarding such synthetic requests for execution by an associated live production resource or can emulate the resource to which it is associated.

Figure 2A:
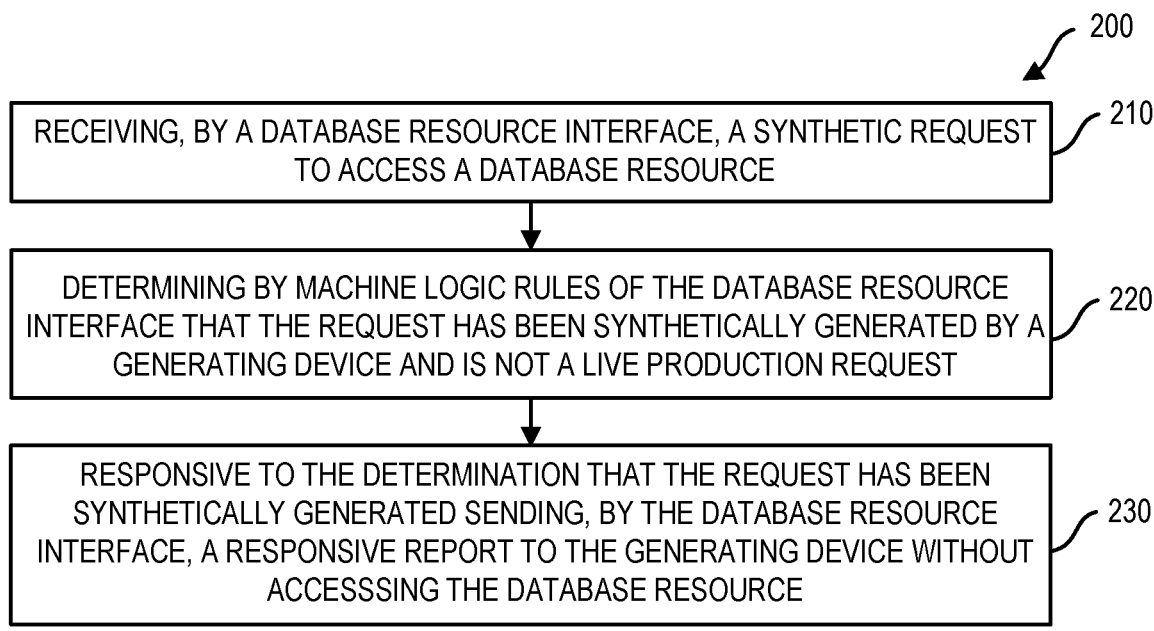
FIG. 2A is a flowchart depicting a method that can be performed by an interceptor system according to one embodiment.

A method 200 for performance a resource interface of resource interfaces 1500A-1500Z is set forth in reference to the flowchart of FIG. 2A. Method 200 can include at block 210 receiving, by a database resource interface, a synthetic request to access a database resource. Method 200 can include at block 220 determining by machine logic rules of the database resource interface that the request has been synthetically generated by a generating device and is not a live production request. Method 200 can include at block 230 responsive to the determination that the request has been synthetically generated sending, by the database resource interface, a responsive report to the generating device without accessing the database resource.

Figure 2B:
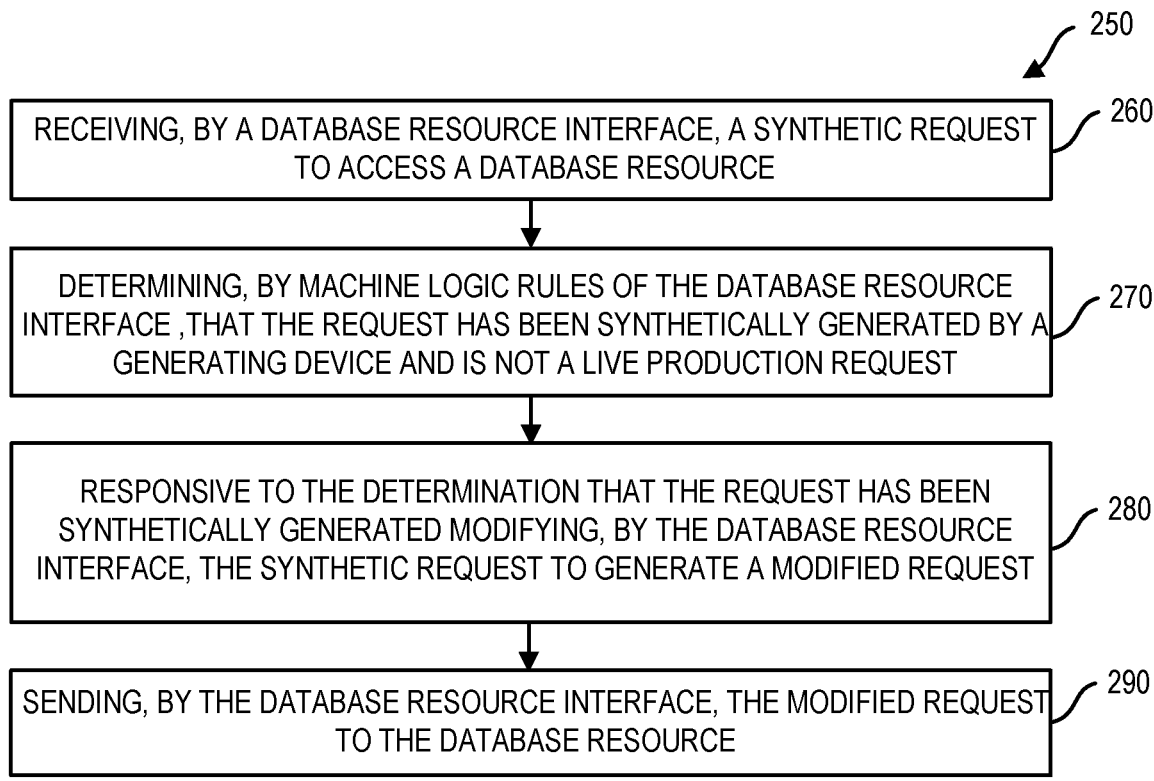
FIG. 2B is a flowchart depicting a method that can be performed by a resource interface according to one embodiment.

A method 250 for performance by a resource interface of resource interfaces 1500A-1500Z is set forth in reference to the flowchart of FIG. 2B. Method 250 can include at block 260 receiving, by a database resource interface, a synthetic request to access a database resource. Method 250 can include at block 270 determining, by machine logic rules of the database resource interface, that the request has been synthetically generated by a generating device and is not a live production request. Method 250 can include at block 280 responsive to the determination that the request has been synthetically generated modifying, by the database resource interface, the synthetic request to generate a modified request. Method 250 can include at block 290 sending, by the database resource interface, the modified request to the database resource.

EXAMPLE A

Live Production Requests

Figure 3:
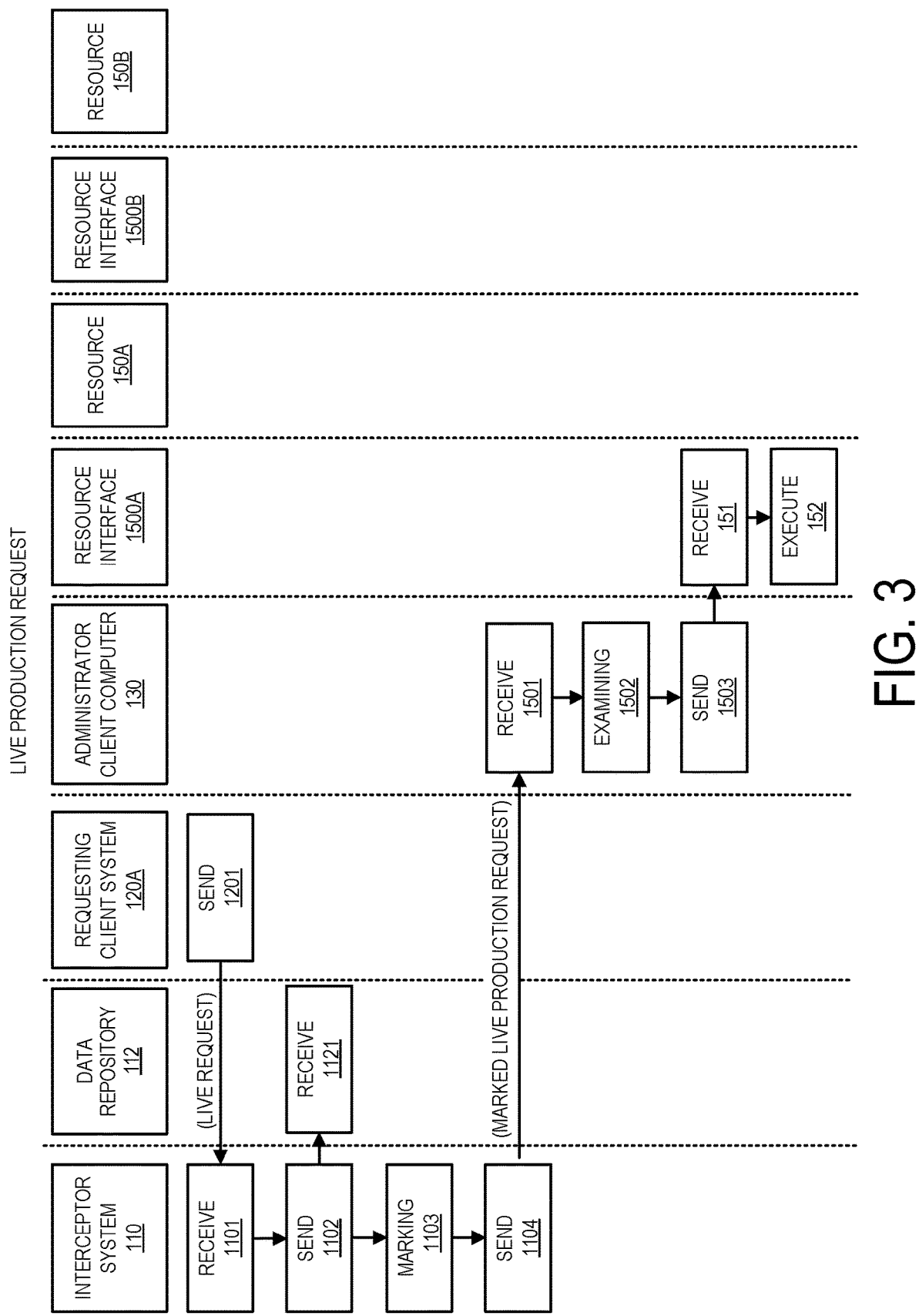
FIGS. 3-8 depict methods that can be performed by a system having an interceptor system and a resource interface according to one embodiment.

The flowchart of FIG. 3 illustrates default operation of system 100 in one embodiment when handling a live production request received from a requesting client. FIG. 3 is a flowchart describing operations of system 100 when handling a live production request received through one or more requesting client system 120A-120Z (FIG. 1). The flowchart of FIG. 3 is set forth with respect to the perspective of interceptor system 110 and its associated data repository 112, requesting client system 120A, administrator client computer 130, resource interface 1500A, resource 150A, resource interface 1500B, and resource 150B.

At block 1201, requesting client system 120A can send the live production request to production environment 190. Based on the configuration of system 100, the live production request sent at block 1201 can be trapped by the action of interceptor system 110 receiving the sent request at block 1101. Interceptor system 110 at block 1102 sends logging data of the received request to requests area 2121 of data repository 112 for purposes of logging the request into a history record of requests.

Resources of production environment 190 can take on various forms. A resource of production environment 190 can include, e.g., a language translator resource, a messaging service resource, e.g. a message queue (MQ) resource, an enterprise service bus resource, an enterprise planning resource (EPR), a customer relations management resource (CRM), a lightweight directory access protocol (LDAP) resource, a relational database resource, a non-relational database resource, an objects storage resource. In one embodiment, the metadata resulting from marking can have the format [serial number] [resource interface identifier], [action], [request type].

At block 1103 interceptor system 110 can perform marking of a live production request received at block 1101. Default metadata for marking a live production request that is passed through production environment 190 can include the format as set forth in (2) below serialnumber='00*', resource interface='*',
action="execute", type="live"     (2)

Based on a completing of marking at block 1103, interceptor system 110 can proceed to block 1104 to send a marked live production request to a specified resource interface, e.g. resource interface 1500A in the described example for receipt by the resource interface 1500A at block 15001. At block 15002, resource interface 1500A can perform examining of metadata of the received marked live production request.

Based on an examining of the request, resource interface 1500A at block 1502 can determine that the received request is a live production request and that the specified action ("execute") requires passthrough forwarding of the live production request to the resource associated with resource interface 1500A for execution i.e. to resource 150A. Based on the examining, resource interface 1500A can proceed to block 1503 to perform sending of the live production request to resource 150A for receipt by the resource at block 1501. At block 1502, resource 150A can perform execution of the received live production request that has been forwarded from resource interface 1500A associated to resource 150A.

EXAMPLE B

Enhanced Live Production Request with Sampling

Figure 4:
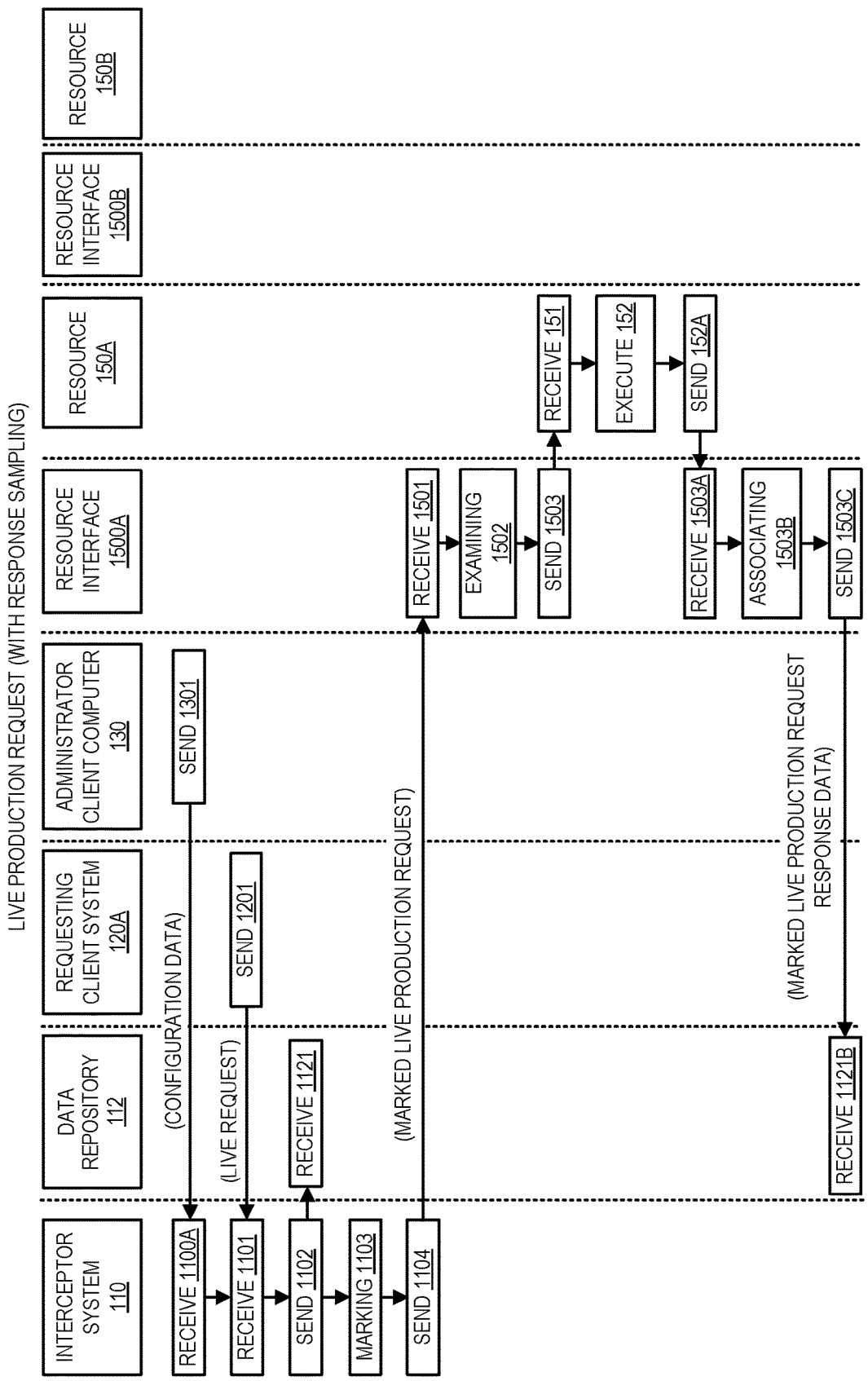

In reference to the flowchart of FIG. 4, there is described operation of system 100 when handling live production requests received from a requesting client system. System 100 being configured to perform sampling of request response data. Embodiments herein recognize that it can be useful for purposes of diagnosing operation and potential problems involving production environment 190 to sample for analysis, live production request response data. With the logic provided by interceptor system 110 and/or resource interface 1500A-1500A live production date—valuable for metrics processing and diagnoses—can be readily sampled with simply defined administrator defined configuration data from any selected resource of production environment 190.

Referring to the flowchart of FIG. 4, administrator client computer 130 at block 1301 can send administrator user defined configuration data for receipt by interceptor system 110 at block 1100A. The configuration data can configure interceptor system 110 so that requests sent to one or more specified resources indicated in the configuration data are executed and sampled. The configuration data in one embodiment can configure interceptor system 110 so that requests sent to one or more specified resources indicated in the configuration data are executed and sampled and sent to data repository 112 where it can be processed for metrics determination automatically or based on administrator user defined control configuration data.

Figure 9:
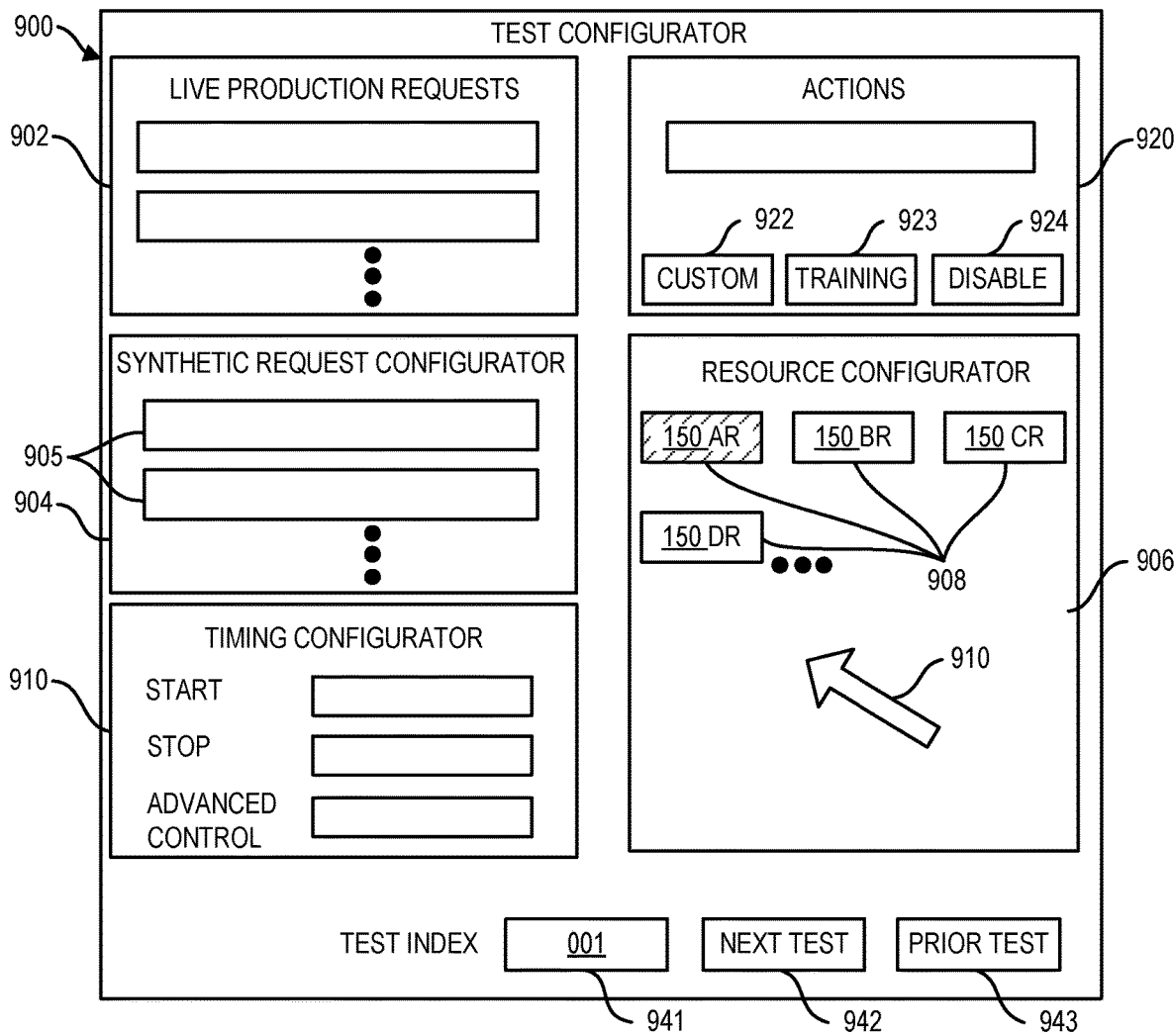
FIG. 9 illustrates an administrator user interface that can be displayed on a display of an administrator client computer device according to one embodiment.

The configuration data sent by administrator client computer 130 as shown in FIG. 1, can be based on control inputs entered into an administrator user interface 900 as set forth in FIG. 9. Administrator user interface 900 can be a displayed user interface displayed on a display of administrator client computer 130. Administrator user interface 900 can be a manually operated user interface, operated by an administrator user of system 100. Administrator user interface 900 can be a user interface for use in configuring a test to be performed using interceptor system 110 with respect to production environment 190, to test the operation of production environment 190. Using live production requests area 902 an administrator user can enter configuration data so that live production requests having defined one or more criterion are subject to specialized processing by interceptor system 110. Using synthetic request configurator area 904 an administrator user can enter data regarding and/or defining synthetic requests to be processed by production environment 190 having resource interfaces associated to resources. Using area 906, an administrator user can specify resources of the plurality of resources 150A-150Z which are to be active during administration of a test being configured using test configurator administrator user interface 900. In one embodiment, there can be displayed an indicator 908 of each resource interface/resource of product environment 190. Using area 910, an administrator user can specify timing parameters of a test being configured, e.g. a start time of the test, a stop time of the test, or other advanced control. For example, a subset of resources can be configured to be active for a portion of a test and inactive for the remaining portion of a test. Using actions area 920 an administrator user can enter data to specify actions to be performed with respect to specific live production or synthetic requests. The actions specified can include actions highlighted in Table A herein. Action selections available using area 920 can include operating modes such as custom defined operating modes that can be custom defined using area 922, a training mode selected using area 923, and a disabling mode that can be selected suing area 924. In area 941 a test index of a test being configured can be displayed. In area 942, user administrator can proceed to configure a next test and can edit a prior test by actuation of button 943.

Using user interface 900 e.g. with use of live production requests area 902 and actions area 920 configuration data sent at block so that sample data is returned in response to a live production request to a certain resource. Based on the configuration data being received at block 1101, interceptor system 110 at blocks 1101-1104 can perform in the manner of blocks 1101-1104 as described in reference to the flowchart of FIG. 3 with a notable exception that at marking block 1103, different actions can be performed. Namely, at marking block 1103 according to operation described with reference to the flowchart of FIG. 4, interceptor system 110 can mark the received live production request received at block 1101 to specify sampling action and response sending action so that request response data is received by data repository 112. An exemplary format for the request metadata provided by the marking at block 1103 is set forth in (3).

serialnumber='00*', resource interface="*N*",
   *N*-action="sample", *N*-action="responsesend",
   type="live"                                            (3)

where N is an identifier of a certain resource of production environment 190 specified by received configuration data received at block 1100A, and where the actions "sample" and "responsesend" are actions of the exemplary actions described in Table A. At block 1104, interceptor system 110 can send a marked live production request for receipt by the specified resource interface 1500A at block 1501.

Operation by resource interface 1500A at blocks 1501, 1502, and 1503 can be as per the operation described with reference to the flowchart of FIG. 3, with a notable exception that at the examining block (1502) the sampling and sending actions are extracted from request metadata and accordingly are initiated. Referring further to the flowchart of FIG. 4, receive and execute blocks 151 and 152 by resource 150A can be as per the operation described with reference to the flowchart of FIG. 3, however on completion of execute block 152 resource 150A can proceed to block 1502A to perform forwarding of live production request response data for receipt by resource interface 1500A at block 1503A.

At block 1503B, resource interface 1500A can perform associating. Associating at block 1503B can include, associating an identifier for the marked live production request sent at block 1104 to the received response data received at block 1503. Accordingly, the marked live production request can be associated to the received response data by the identifier for the marked live production request. At block 1503C, resource interface 1500A can send the marked live production request response data associated at block 1503 for receipt by interceptor system 110 at block 1104A. At block 1104B, interceptor system 110 can send the received live production request response data for receipt by data repository 112 at block 1121B whereupon the live production request response data can be responsively stored in data repository 112, e.g. in response data area 2122.

In the illustrative examples of the flowcharts of FIGS. 3 and 4 the request received at block 1501 terminates at a first resource interface/resource. In many use cases a request is a through request that continues through a first resource interface/resource and is handled by more than one resource interface/resource wherein a response of receiving resource interface/resource invokes a next resource interface/resource. Proper handling of such requests can be provided e.g. using appropriate marking of a requests by interceptor system 110 and ensuing resource interfaces handling such requests or through resource state control. Processes handling through requests are described in further detail herein.

EXAMPLE C

Synthetic Requests

Figure 5:
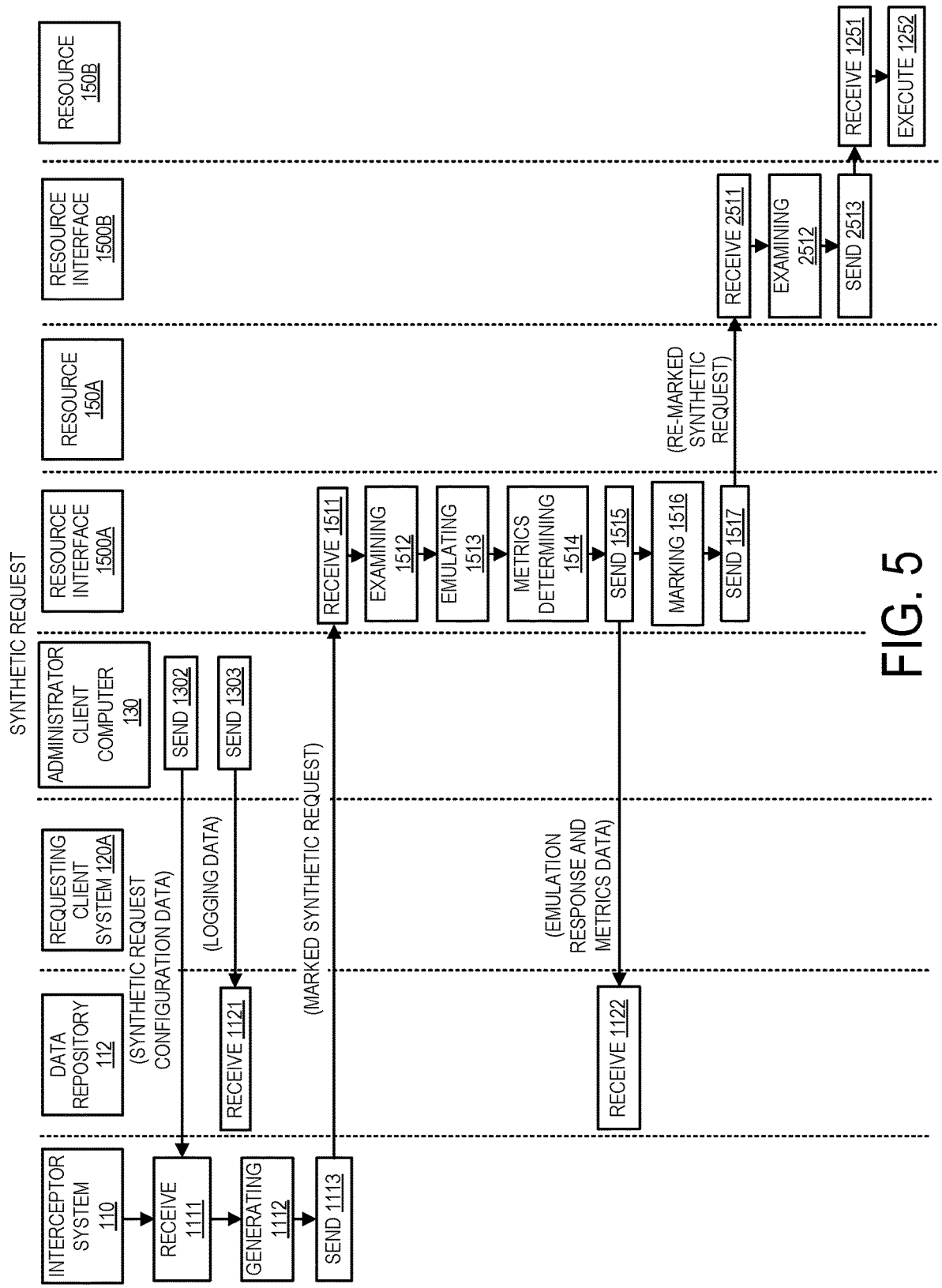

FIG. 5 is a flowchart illustrating exemplary operation of system 100 when handling a synthetic request. The flowchart of FIG. 5 is set forth from the perspective of interceptor system 110 and its associated data repository 112, requesting client system 120A, administrator client computer 130, resource interface 1500A, resource 150A, resource interface 1500B, and resource 150B.

At block 1302, synthetic request configuration data can be sent from an administrator client computer 130 for receipt by interceptor system 110 at block 1111. The configuration data can specify e.g. content of the synthetic request, one or more resource having a resource interface for receipt of the request, and one or more action. Administrator client computer 130 at block 1303 can send logging data for logging information of one or more synthetic requests configured based on administrator user defined configuration data for receipt at block 1121 by data repository 112 for storage into requests area 2121.

Based on receiving synthetic requests configuration data at block 1111, interceptor system 110 can proceed to block 1112 to perform generating a synthetic request based on the received synthetic request configuration data. Performing generating at block 1112 can include formatting synthetic request for processing by production environment 190. Applying a synthetic request to production environment 190 can yield information on how a future live production request corresponding to the synthetic request will impact production environment 190.

Performing generating a live production request at block 1112 based on received synthetic request configuration data can include activating marking process 117 as set forth in reference to FIG. 1. Synthetic requests, like live production requests, can be marked by interceptor system 110, running marking process 117 to mark the request with metadata that determined processing of the request by production environment 190. The format of a marked message herein can be the same whether the marking is of a live production request or the marking is a marking of a synthetic request. A marking performed by marking process 117, whether the request is a live production request or a synthetic request, can have the format [serial number], [resource interface identifier], [action], [request type]. Thus, a synthetic request marked by marking process can be marked to indicate an identifier of a certain resource interface that will receive and process the synthetic request and action to be performed by the receiving resource interface and a type of the request, i.e. live production or synthetic.

A default action type specified by a marking of the synthetic request can be the action of executing the request by the resource interface, i.e. so that the resource interface emulates operation of the resource associated to the resource interface without passthrough forwarding of synthetic request to an associated resource for execution. An exemplary format for metadata for a synthetic request subject to marking as part of performing generating is set forth in (4).

serialnumber='00*', resource interface="N",
   N-action="emulate", N-action="metric",
   N-action="responsesend", type="synthetic";
   NEXTRESOURCE-action="execute"                       (4)

where N is an identifier of a certain resource of production environment 190 specified by received configuration data received at block 111, and where the actions "emulate" and "metric" and "responsesend" and "execute" are actions of the exemplary actions described in Table A.

Based on the generating of an appropriately formatted synthetic request at block 1112, interceptor system 110 at block 1113 can perform sending of the marked synthetic request to a resource interface of resource interfaces 1500A-1500Z, i.e. resource interface 1500A, for receipt by resource interface 1500A at block 1511.

Based on resource interface 1500A, receiving the marked synthetic request at block 1511 resource interface 1500A can proceed to block 1512, to perform examining of the received marked synthetic request. Resource interface 1500A at block 1512 based on examining of the received marked synthetic request at block 15012 resource interface 1500A can determine that the received synthetic request is marked (with the action "emulate") to indicate that the request is to be emulated on resource interface 1500A, without passthrough forwarding of the synthetic request to resource 150A for execution and can further determine by examining of markings of the marked synthetic request, that the request is a synthetic request. Based on the described examining resource interface 1500A can at block 1513 emulate execution of the received synthetic request without passthrough-forwarding of the synthetic request for execution by resource 150A.

At block 1514 resource interface 1500A based on the extracted "metrics" action metadata subject to examining at block 1512 can perform metrics determining of the response data returned by emulating at block 1512 to determine metrics associated emulation response data.

At block 1515 resource interface 1500A based on the extracted "response/send" metadata subject to examining at block 1512 can send emulation response data and metrics data to data repository 112, for receipt by data repository 112 at block 1122. Response data (from a simulation or execution) and/or metric data sent by a resource interface 1500A-1500Z can define a report.

In the scenario depicted in the flowchart of FIG. 5 the synthetic request sent at block 1113 is a through request which invokes handling by a second resource interface and/or resource after being handled by first resource interface or resource.

Based on a determination that emulation response data generated by the emulating at block 1513 invokes handling by another resource interface or resource interface 1500A can proceed to block 1516 to perform marking to mark an outgoing through request so that the through request is appropriately handled by a next resource interface and/or resource.

At block 1517, resource interface 1500A can perform sending of a marked synthetic through request for receipt by resource interface 1500B. Resource interface 1500B on receipt of the marked synthetic request at block 2511, can perform examining of the marked synthetic request at block 2512. In the described example, the marked synthetic request (re-marking based on marking performed by resource performed by resource interface 1500A at block 1516) can include marking to specify the action of "execute". Based on the "execute" action being specified resource interface 1500B in the described example can at block 2513 passthrough forward the synthetic request for execution by resource 150B associated to resource interface 1500B. At block 1251 resource 150B can receive the through request synthetic request and can execute the through request synthetic request at block 1252. By the examining at block 2512 prior to sending of the synthetic request at block 2513 for receipt and execution by resource 150B at block 1251 and block 1252, resource interface 1500B can modify the synthetic request received at block 2511.

In the described example of the flowchart of FIG. 5 the "second hop" resource interface/resource executes rather than emulates the synthetic request, based on the NEXTRESOURCE-action="execute" specifier appended at the metadata of (4) which can be based on the configuration data received at block 1111 (any alternative action e.g. from Table A can be specified).

In one embodiment, system 100 can be configured so that by default in the absence of configuration data specifying otherwise, any marking of an outgoing through request synthetic request performed at the stage corresponding to marking block 1516 can specify the actions "emulate" "metric" and "response/send" so that any ensuing "hops" in the travel of the through request synthetic request result in emulation and not production resource execution at each next resource interface/resource hop. The ensuing hops can also result in metrics determining in the manner of block 1514 as well and emulation response data and metrics data sending in the manner of block 1515. By the marking at block 1516 resource interface 1500A can modify the through request synthetic request received at block 1511.

Thus, it will be seen that system 100 can provide robust testing using synthetic requests applied to production environment 190 having a plurality of resources 150A-150Z in a manner that does not invoke processing of any request by any resource 150A-150Z unless a particular test plan specifies such operation (which can be advantageous in certain use cases).

With reference again to the administrator user interface 900 of FIG. 9 an administrator user in one embodiment, can use area 905 to manually author synthetic requests that are marked my interceptor system 110. In another embodiment, synthetic requests are not manually authored but can be automatically provided based on live production requests such as historical live production requests logged in requests area 2121 of data repository 112 or even based on real-time live production requests.

In one embodiment, synthetic request configurator area 904 of administrator user interface 900 can provide for selections of automated synthetic request providing modes such as a "use history" mode and a "real-time" mode. When a "use history" mode is selected, an administrator user is allowed to designate select prior live production requests from requests area 2121 and based on the selections which are indicated in configuration data sent to interceptor system 110 can base generation of marked synthetic requests on the selected historical live production requests, e.g. can copy the prior requests from request area 2121 of data repository 112, edit the requests if necessary based on changes to the production environment 190 and mark the requests according to received configuration data. When a "real-time" mode is selected an administrator user can be allowed to designate the portions (resources) of the production environment to which synthetic requests are to be applied (an entire production environment can be selected or a subset for resources) and timing parameters of the real-time mode. The selections are indicated in configuration data sent to interceptor system 110 which can based on the configuration perform marking of real-time live production requests with metadata which transforms the live production requests into synthetic requests. For example, based on user administrator defined configuration data interceptor system 110 can mark the synthetic requests that are based on real-time live production requests to specify one or more action (e.g. "emulate") so that resource interfaces receiving the marked synthetic request emulate without performing passthrough forwarding of the requests for execution to an associated resource. Thus, resources of production environment 190 can easily be protected from receiving live production requests if such action is deemed desirable.

EXAMPLE D

Training Mode

Figure 6:
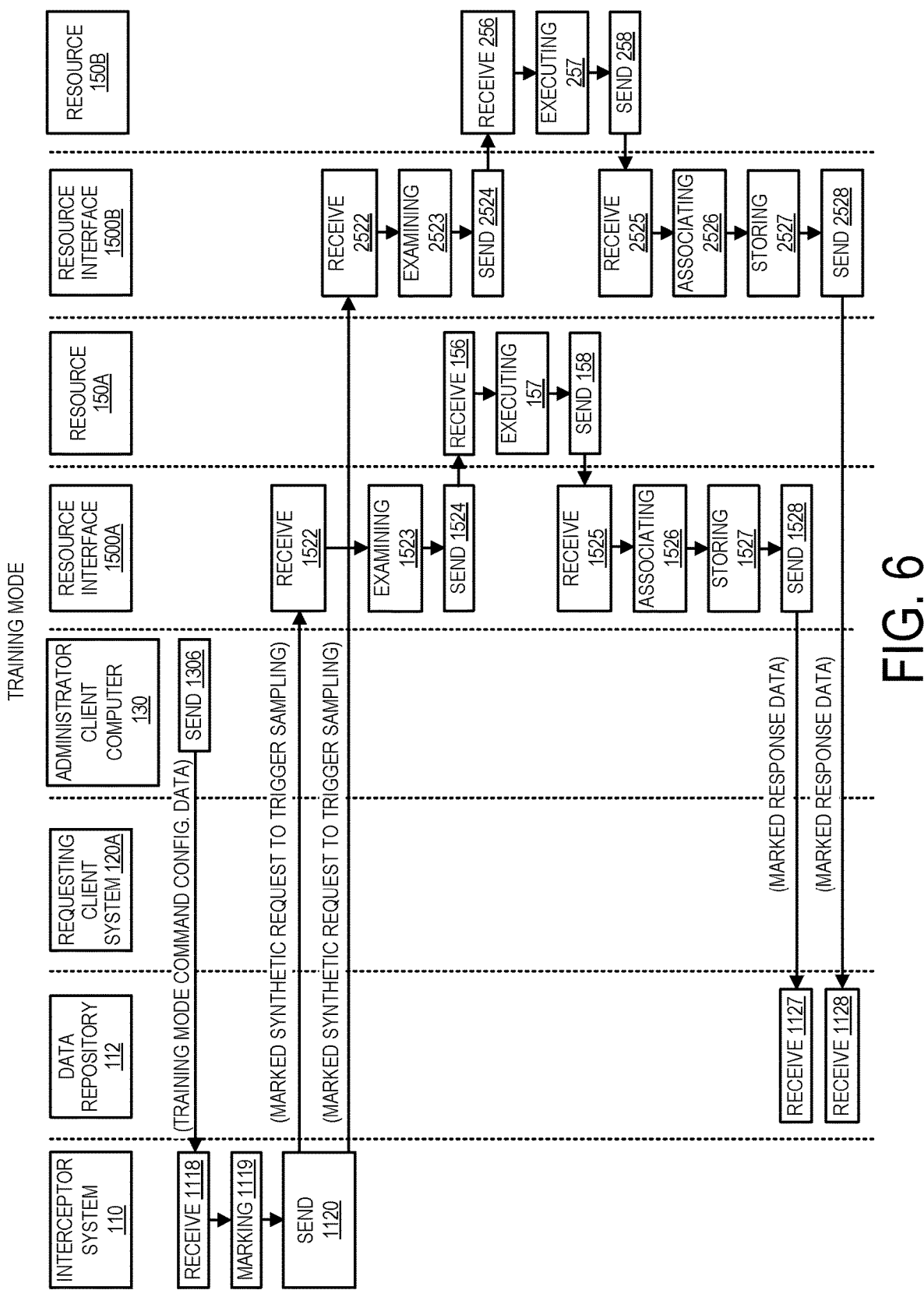

The flowchart of FIG. 6 illustrates features of a training mode that can be made available with use of system 100. With reference to block 1513 of flowchart of FIG. 5, it was described that a resource interface of resource interfaces 1500A-1500Z of production environment 190 can perform emulating to emulate executions of requests by resources.

Embodiment herein recognize that emulations performed by shadow resources in shadow environments can be of poor quality. For example, such emulations might be based on guesswork by an administrator, or models that are outdated or otherwise not representative of a true characteristic of a resource being modeled.

The flowchart of FIG. 6 illustrates a convenient way by which resource interfaces 1500A-1500A of production environment 190 can be configured to emulate the operation of their respective resources of resources 150A-150Z. At block 1306 administrator client computer 130 can send, for receipt by interceptor system 110 at block 1118, training mode command configuration data. Training mode command configuration data can be defined by an administrator user using administrator user interface 900 as shown in FIG. 9. For example, referring to FIG. 9 an administrator user using administrator user interface 900 can define training mode command configuration data using area 923. At block 1119, interceptor system 110 can perform marking of a synthetic request to trigger sampling. The synthetic request subject to marking at block 1119 can be a specialized synthetic request configured to operate in support of the training mode described herein. An exemplary format for metadata of marked synthetic requests marked at block 1119 is set forth in (5)

serialnumber='00*', resource interface="*",
action="sample", action="storesample",
action="responsesend", type="synthetic" (5)

At block 1120, marked requests to trigger sampling can be sent for receipt, e.g. by all resource interfaces 1500A-1500Z of production environment 190 or a selected set of such resource interfaces.

At block 1522 resource interface 1500A can receive the marked synthetic request to trigger sampling sent at block 1120 and at block 1523 can perform examining of the marked received synthetic request. Resource interface 1500A at block 1523 can determine that a trigger sampling synthetic request has been received and accordingly at block 1524 can passthrough forward the synthetic request for receipt by its associated resource 150A at block 156. At block 157, resource 150A can perform executing of the received request and at block 156 can send request response data resulting from the execution of the response at block 157. Sending of response data at block 156 can include sending of response data to resource interface 1500A for receipt by resource interface 1500A at block 1525. At block 1525, resource interface 1500A can perform associating of the request response data to an identifier for the marked synthetic requests sent at block 1120 and at block 1527 can perform storing of the request response data into data store 2505 (FIG. 1) of resource interface 1500A. Thus, by the storing of request response data at block 1527, resource interface 1500A is configured on receipt of future live or synthetic requests to respond in the manner of its associated resource 150A and is thus trained to emulate the associated resource 150A. At block 1528, resource interface 1500A can send marked response data marked with an identifier of its associated synthetic request for receipt by data repository 112 at block 1127. Data repository 112 can responsively store the received marked response data into response data area 2122 of data repository 112.

The processes described as being performed by resource interface 1500A at block 1522-1528 and resource 150A at blocks 156-158 can be performed by each resource interface/resource receiving a marked synthetic training mode request at block 1120. For example, processing at blocks 2522-2528 and blocks 256-258 by the resource interface/resource defined by resource interface 1500B and resource 150B can be as per the operation of blocks 1522-1528 and blocks 156-158 defined by defined by resource interface 1500A and resource 150A. Response data from the sending at block 2528 can be received by interceptor system 110 at block 1128.

System 100 can be configured so that the training mode depicted in refence to the flowchart of FIG. 6 can be run iteratively for a plurality of or all resources of a production environment 190 so that emulation response data which can be provided by resource interfaces 1500A-1500Z is iteratively updated, and can remain accurate at all times, even as significant changes are implemented throughout a production environment.

System 100 can be configured to iteratively and automatically "audit" the capability of each resource interface 1500A-1500Z to emulate the function of its associated resource 150A-150Z. For example, based on configuration data defined using administrator user interface 900 interceptor system 110 can iteratively and automatically generate a synthetic request having metadata specifying the actions "emulate", "sample", "metric" and "responsesend". Based on received and examined metadata a receiving resource interface/resource will perform both emulation by a resource interface and execution of the synthetic request by an associated resource. Based on received and examined metadata and the resource interface/resource will send metrics and response data for both the emulation and the resource execution. Interceptor system 110 can be configured so that in response to the receipt of the combined data of the emulation and the execution (metric data and/or response data) interceptor system 110 automatically subjects the combined data to a dissimilarity scoring processing and can automatically initiate a next synthetic request with "sample" and "storesample" actions to update a resource interface's capability to emulate its associated resource based on the dissimilarity score exceeding threshold.

EXAMPLE E

Resiliency Testing

Figure 7:
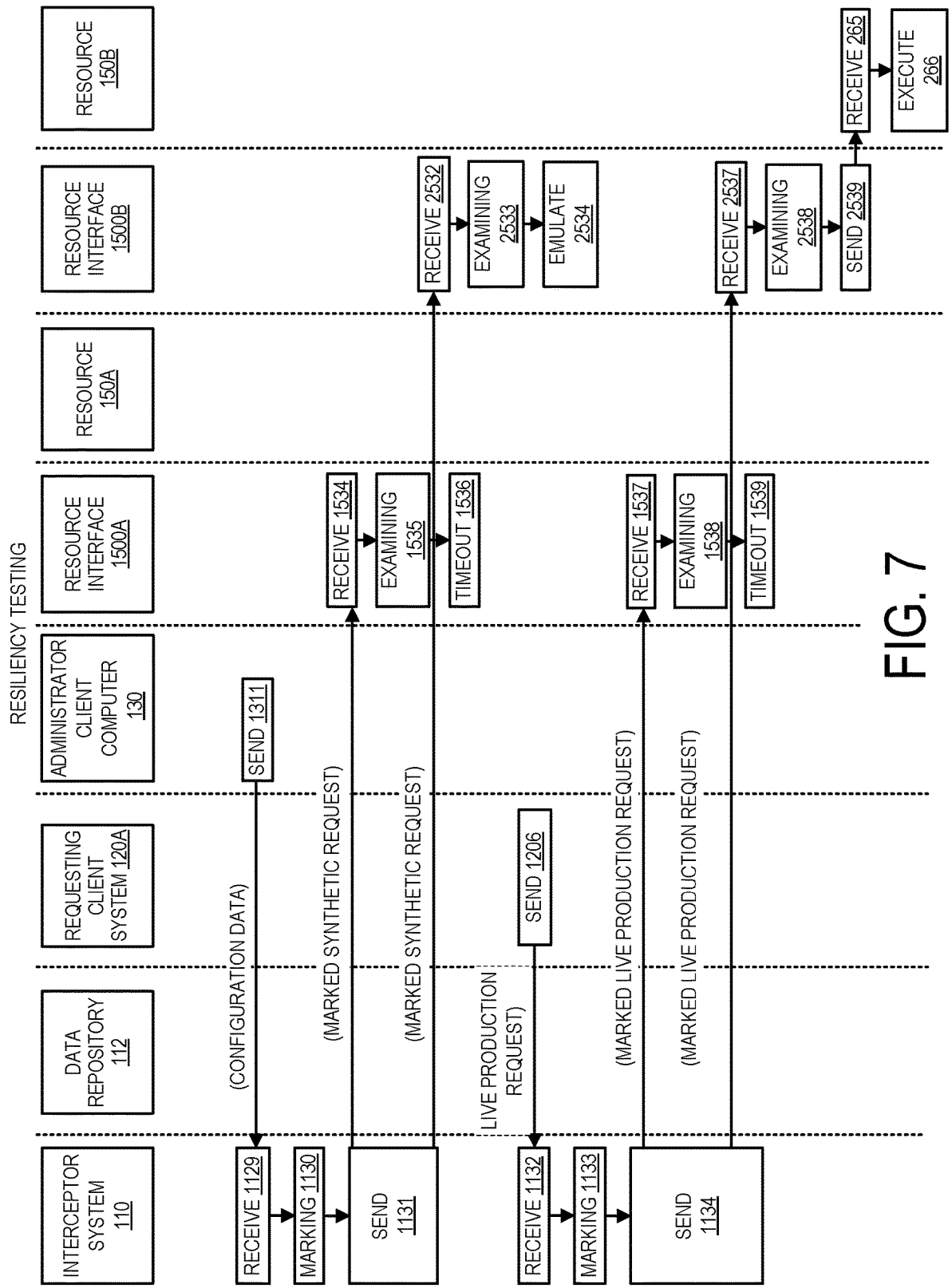

With reference to the flowchart of FIG. 7, resiliency testing that can be performed by using system 100 in one embodiment is described. From time to time it may be useful to ascertain the effect of failure or of diminished performance of one or more resource 150A-150Z of production environment 190.

At block 1311 administrator client computer 130 can send configuration data to interceptor system 110 for receipt by interceptor system 110 at block 1129. The configuration data specifying operation in accordance with a resiliency testing of one or more resource, e.g. resource 150 to simulate and discern an effect of outage of one or more resource e.g. resource 150A.

Responsively to the receipt of configuration data at block 1129, interceptor system 110 can proceed to block 1130 to perform marking of one or more synthetic requests in accordance with defining performed by an administrator user interface 900 as shown in FIG. 9. An exemplary format for metadata of marked synthetic requests marked at block 1131 is set forth in (6) and (7)

serialnumber='00*', resource interface="$M$",
  $M$-action="do-nothing", $M$-action="metric",
  $M$-action="responsesend", type="synthetic"  (6)

serialnumber='00*', resource interface="$N$",
  $N$-action="emulate", $N$-action="metric",
  $N$-action="responsend", type="synthetic"  (7)

Where (6) illustrates an exemplary format for metadata marking a synthetic request to a resource interface/resource which is to simulate an outage, and (7) illustrates an exemplary format for metadata marking a synthetic request to a resource interface/resource that is not simulating an outage condition.

At block 1131, interceptor system 110 can send a first marked synthetic request formatted according to (6) for receipt by resource interface 1500A at block 1534 and a second marked synthetic request formatted according to (7) for receipt by resource interface 1500B at block 2532. The different resource interfaces 1500A and 1500B can be configured differently depending on whether they are configured to operate in accordance with a simulated outage operation. On receipt of its respective marked synthetic request at block 1534, and on examining the request metadata to extract the "do-nothing" action identifier at block 1535 resource interface 1500A simply times out at block 1536. Resource interface 1500A can send any response data with metrics data (not depicted in the flowchart of FIG. 7) in accordance with the specified responsesend action and metrics action of (6) to data repository 112. Resource interface 1500B can respond to its marked synthetic request by emulating operating of its associated resource. At block 2533, resource interface 1500B can perform examining of the marked synthetic request received at block 2532 and can extract the "emulate" action therein to the request. Resource interface 1500B can emulate performance of resource 150B at block 2534 and can send any emulation response data with metrics data (not depicted in the flowchart of FIG. 7) in accordance with the specified responsesend action and metrics action of (7) to data repository 112.

Simulations of outages can be provided using live production requests as well as synthetic requests. Referring to block 1206, a live production request can be sent by requesting client system 120A at block 1206, for receipt by interceptor system 110 at block 1132. Interceptor system 110 at block 1133 can responsively perform marking of the one or more live production requests and can responsively send one or more marked live production requests to a plurality of resource interfaces such as resource interface 1500A and resource interface 1500B. An exemplary format for metadata of marked synthetic requests marked at block 1131 is set forth in (8) and (9).

serialnumber='00*', resource interface="$M$",
  $M$-action="do-nothing", $M$-action="metric",
  $M$-action="responsesend", type="live"  (8)

serialnumber='00*', resource interface="$N$",
  $N$-action="sample", $N$-action="metric",
  $N$-action="responsend", type="live"  (9)

Where (8) illustrates an exemplary format for metadata marking a live production request to a resource interface/resource which is to simulate an outage, and (9) illustrates an exemplary format for metadata marking a live production request to a resource interface/resource that is not simulating an outage condition.

The different resource interfaces can respond differently based on whether they are configured to operate in accordance with an outage simulation mode in response to the marked live production request received. At block 1539, resource interface 1500A configured to operate in a simulated outage mode merely times out after receipt of a marked live production request at block 1537 and examining metadata at block 1538 to extract the "do-nothing" action of (8). Resource interface 1500B can respond to the marked live production request by passthrough forwarding the live production request to its associated resource 150B for execution according to the "sample" action of (9). Resource interface 1500A can send any response data (not depicted in the flowchart of FIG. 7) and determined metrics data in accordance with the specified response/send action and metrics action of (8) to data repository 112. At block 2537, resource interface 1500B can receive a marked live production request sent at block 1134 and can perform examining of metadata of the request at block 2538 and sending of the request at block 2539 for receipt by its associated resource 150B at block 265. At block 266 resource 150B can execute the received response. Resource interface 1500B on receipt of response data from resource 150B can send (not depicted in the flowchart of FIG. 7) the response data with metrics data to data repository 112 in accordance with the specified response/send action and metrics action of (9).

The synthetic requests received at blocks 1534 and blocks 2532 and the live production requests received at block 1537 and block 2537 are depicted as terminating at a first "hop" subsequent to being sent from interceptor system 110 but could also be through requests. System 100 can be configured to operate in compliance with logic wherein a failure mode is simulated selectively for select resources such as resource 150A selected for emulation but not other resources. The specified logic can be provided in a variety of ways. For example, appended metadata can be defined for a synthetic request sent by interceptor system 110 that specifies action by "next hop" resource interfaces/resources as set forth in connection with (4). In addition or alternatively, the specified logic can be provided in connection with established states for resources having associated resources.

Referring to administrator user interface 900 as shown in FIG. 9, resource configurator area 906 can be used to select states associated with different resources and the selected state can affect the behavior of a resource interface associated to a resource. Referring to area 906 icons 150AR-150ZR can be provided to represent each resource 150A-150Z and resources can be selected for an inactive state e.g. designated by shade out of the icon as indicated by the icon 150AR for the resource. An administrator user can configure behavior associated to a deactivated resource e.g. using area 920 to specify actions associated to an inactive resource. For example the action "do-nothing" can be associated to an inactive certain resource (e.g. resource 150A in the described example) so at each time a request (synthetic, live production, Nth hop) is received by the resource interface associated to the certain resource so that the resource interface simulates an outage. In another example, a resource can be configured to be inactive during a configured test only for synthetic requests but not live production requests or vice versa. In another example, the actions "emulate" and "responseend" are associated to inactive resources so that inactive resource interface/resources emulate the functions of their resources without executing on receipt of a synthetic request or live production request.

Figure 10:
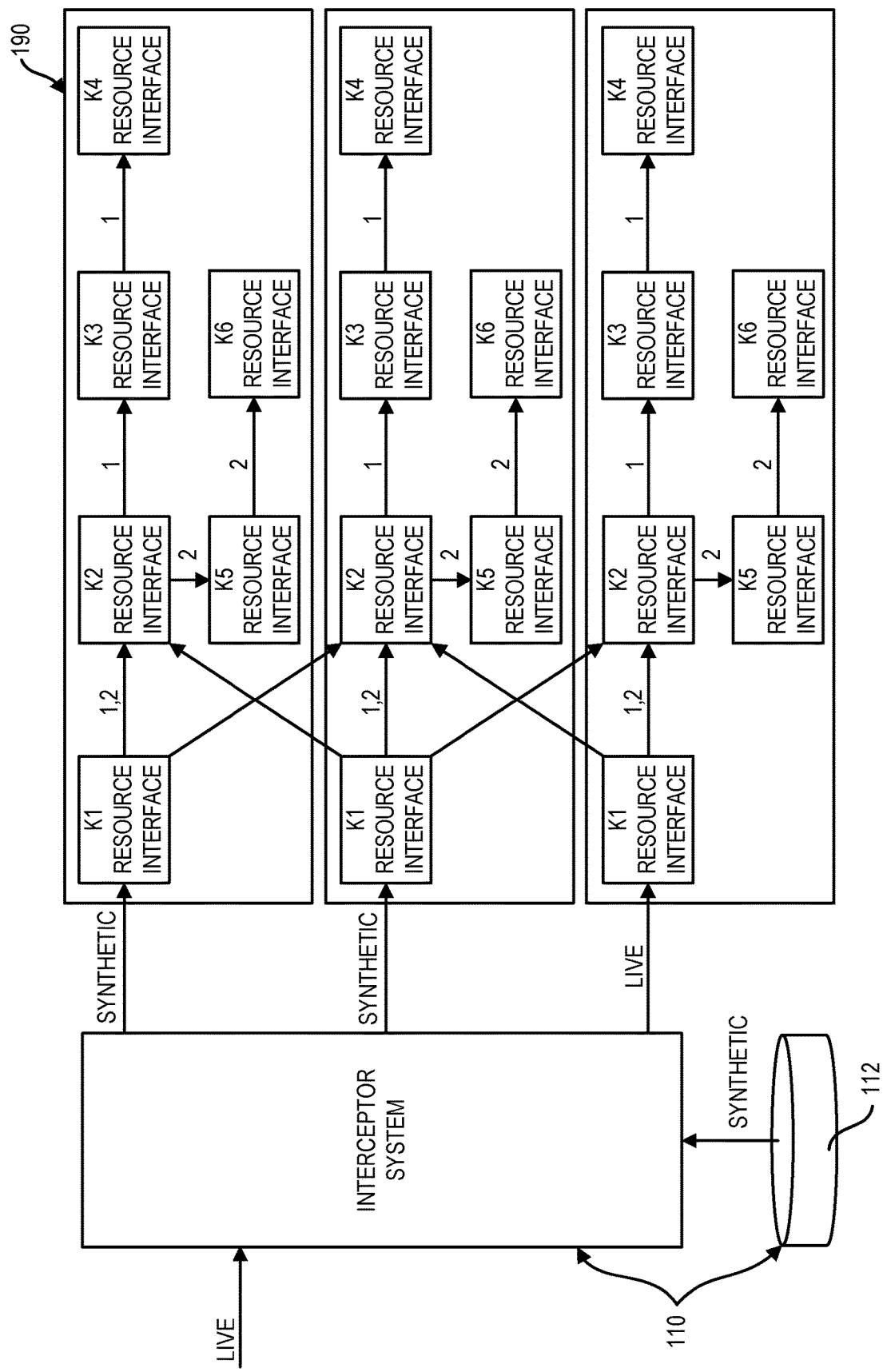
FIG. 10 is a schematic diagram of a system having an interceptor system and resource interface in a production environment.

In one embodiment, with active and inactive states for resources defined, system 100 can be configured so that when a resource interface receives a request for an inactive resource it disregard metadata associated with the request if an action specified is in conflict with the specified configuration action attributes associated to the inactive resource. In another embodiment, all current resource states (active and inactive) are recorded in resource states area 2124 of data repository 112 and interceptor system 110 can be configured so that when interceptor system 110 marks a request for sending to production environment 190 interceptor system 110 examines the current state of each resources and performs the marking so as to be in compliance with the configured behavior of each inactive resource. Referring the schematic diagram of FIG. 10, the live arrow represents live production requests and they are initiated from various clients e.g. of requesting client systems 120A-120Z (FIG. 1) whereas synthetic requests can be initiated by interceptor system 110. The Synthetic arrow indicates synthetic requests. The number above the arrow represents a request type. Each resource interface 1500A-1500Z (depicted with the notation Rx in FIG. 10) can appropriately mark a through request for a next resource interface of a live production environment 190. The resource interface indicated in FIG. 10 represent resource interfaces of resource interfaces 1500A-1500Z for respective resources 150A-150Z where a resource may be e.g. a language translator resource, a messaging resource (e.g. a message queue (MQ) resource), an enterprise service bus resource, an enterprise planning resource (EPR), a customer relations management resource (CRM), a lightweight directory access protocol (LDAP) resource, a relational database resource, a non-relational database resource, an objects storage resource, or another type of resource. Interceptor system 110 can simultaneously apply live production requests and synthetic request to production environment 190.

In this Example 7 there is described a simulation wherein one or more certain resource is configured so that a resource interface of the resource simulates an outage configuration. In another use case, other failures can be simulated such as failures of resources that do not involve complete outage of a resource. Embodiment herein recognize that it can be useful to simulate a scenario where slow down but not an outage of one or more resource is simulated. For providing such functionality, system 100 can be configured to that the action of "delay=*ms" is substituted for the action of "do-nothing" in the metadata described with reference to (6) or (8) and/or in the selected actions associated to selected inactive resources that can be selected using resource configurator area 906 of administrator user interface 900 (FIG. 9).

EXAMPLE F

Disabling Features

Embodiments herein feature low overhead operation and production environment 190 can be configured to respond to both live production requests and synthetic requests. The low overhead operation can include for example in one embodiment, interceptor system 110 adding lightweight metadata to receive and forward live production requests or establishing synthetic requests having such tags and can also include resource interface 1500A examining such metadata and taking appropriate action. In another aspect, in times where features of interceptor system 110 or resource interfaces 1500A-1500Z are not being utilized, functionalities associated with interceptor system 110 and resource interfaces 1500A-1500Z, can be configured via appropriate commands to be disabled altogether so that interceptor system 110 and resource interfaces 1500A-1500Z have essentially no impact on the operation of production environment 190.

Figure 8:
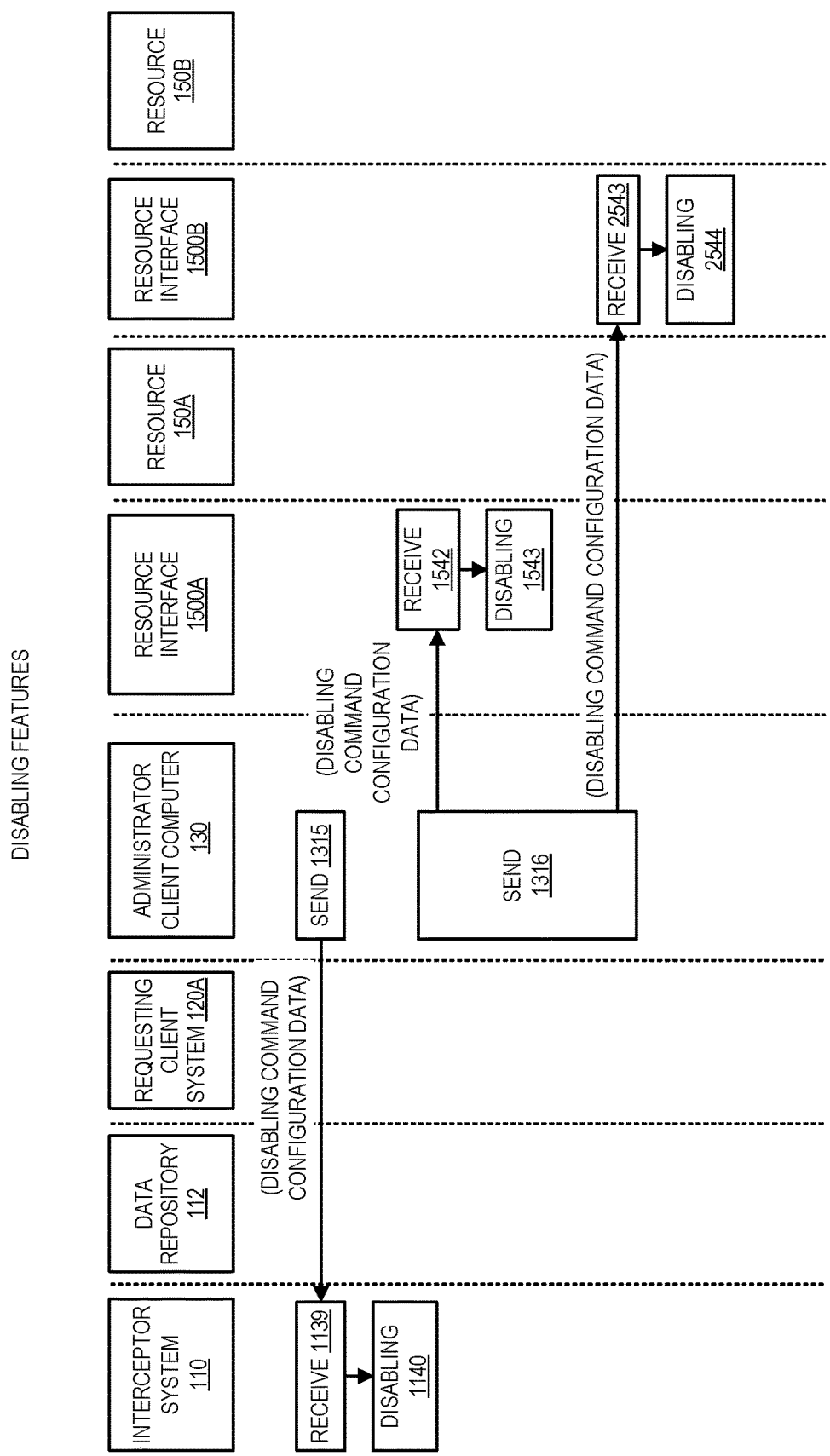

Referring to the flowchart of FIG. 8, administrator client computer 130 at block 1315 can send disabling command configuration data for receipt by interceptor system 110 at block 1139. Responsively to receipt of the command data, interceptor system 110 at block 1139 can perform disabling at block 1140. Disabling at block 1140 can include configuring interceptor system 110 to be restricted from performing any marking operations so that all incoming live production requests are not marked but instead are passed through interceptor system 110 in a format identical to the format in the absence of interceptor system 110. At block 1316, administrator client computer 130 can send disabling command configuration data to each resource interface 1500A-1500Z of production environment 190.

On receipt of the disabling command configuration data the respective resource interfaces can perform disabling operations. On receipt of the disabling command at block 1542, resource interface 1500A can perform disabling at block 1543. On receipt of the disabling command at block 2543, resource interface 1500B can perform disabling of resource interface 1500B at block 2544. Disabling of a resource interface, e.g. at block 1543 by resource interface 1500A or resource interface 1500B at block 2544 can include configuring the resource interface to be restricted from performing any examining of any metadata that may have been marked by interceptor system 110 so that each resource interface 1500A passthrough forwards all requests to its associated resource. Accordingly, the respective resource interfaces 1500A-1500Z can operate essentially in the manner of their respective operations in the absence of their respective resource interfaces 1500A-1500Z.

The functions described with reference to Examples A-F can be applied to a variety of different production environments having a variety of different resources.

According to one embodiment, synthetic and production requests can be sent to language translator application resources such as a language translator service resource. A language translation request to a language translator service resource can include the following fields of data: (i) account number of the requestor; (ii) token data authorizing provision of the translation services; (iii) network address to which the translated text is to be returned; (iv) identification of source language; (v) identification of target language; and (vi) text to be translated. Interceptor system 110 in one embodiment can send requests having metadata formatted as follows: resource interface="LanguageTranslator", LanguageTranslator-action="sample", type="synthetic" as possibly a header on top of the request data.

According to one embodiment, synthetic and production requests can be sent to a messaging system resource such as a message queue (MQ) that allow "production" users to access messaging services through a messaging client. A messaging system request to a message system resource can include the following fields of data: (i) message ID to identify a specific message, (ii) a get operation to get a specific message that has a specific ID, (iii) transactional field to indicate the message should be retrieved within a transaction, (iv) the messaging engine IP address and port. Interceptor system 110 in one embodiment can send requests having metadata formatted as follows: serialnumber='00*', resource interface="MQ", MQ-action="delay-5 s", type="live" as possibly a header on top of the request data.

According to one embodiment, synthetic and production requests can be sent to enterprise service bus (ESB) implementations. An enterprise service bus request to an ESB resource can include the following fields of data: (i) a request class that describes the type of request such as Order, (ii) an operation to transform the request data, (iii) the actual data to be transformed, (iv) the IP address and port of the ESB. Interceptor system 110 in one embodiment can send requests having metadata formatted as follows: serialnumber='00*', resource interface="ESB", ESB-action="Speed-5 ms", type="synthetic" as possibly a header on top of the request data.

According to one embodiment, synthetic and production requests can be sent to a customer relationship management (CRM) resource such as a CRM server. An CRM request to a CRM resource can include the following fields of data: (i) record ID of a customer, (ii) the IP address and port of the CRM system. Interceptor system 110 in one embodiment can send requests having metadata formatted as follows: serialnumber='00*', resource interface="ERP", ERP-action="do-nothing", type="synthetic" as possibly a header on top of the request data.

According to one embodiment, synthetic and production requests can be sent to a lightweight directory access protocol (LDAP) resource such . An LDAP request to an LDAP resource can include the following fields of data: (i) distinguished name of a user, (ii) the user password. Interceptor system 110 in one embodiment can send requests having metadata formatted as follows: serialnumber='00*', resource interface="LDAP", LDAP-action="delay-10 s", type="synthetic" as possibly a header on top of the request data According to one embodiment, synthetic and production requests can be sent to relational database resource. A relational database request to a relational database resource can include the following fields of data: (i) A select statement to get some records, (ii) match condition, (iii) a table name. Interceptor system 110 in one embodiment can send requests having metadata formatted as follows: serialnumber='00*', :resource interface="DB", DB-action="speed-2 ms", type="synthetic" as possibly a header on top of the request data.

Another type of embodiment involves synthetic and production requests can be sent to non-relational database resource. A non-relational database request to a non-relational database resource can include the following fields of data: (i) a list of documents to retrieve, (ii) a match condition, (iii) a view name. Interceptor system 110 in one embodiment can send requests having metadata formatted as follows: serialnumber='00*', resource interface="Cloudant", Cloudant-action="Delay 10 ms", type="synthetic" as possibly a header on top of the request data.

In any of the described examples herein that reference a specific resource type, metadata that is marked by marking process 117 can mark the request in a format consistent with existing metadata formatting of the request so as to economize a number of data fields. For example, in reference to the language translator example, a negative account number (field (i)) could indicate a synthetic request, and the absolute value of the negative number could be coded to indicate the manner in which the synthetic request is to be responded to (an action of the request).

A small sample of methods and products that are set forth herein include the following. A1. A method comprising: marking of a request to define a marked request that includes metadata, wherein the metadata specifies action for performing by a resource interface associated to a production environment resource of a production environment, wherein the resource interface is configured for emulating functionality of the production environment resource; and sending the marked request to the resource interface for performance of the action specified by the metadata. A2. The method of A1, wherein the request is a live production request from a requesting client computer, and wherein the method includes receiving request response data associated to the request, the request response data being generated by the resource interface. A3. The method of A1, wherein the request is a synthetic request initiated based on administrator user defined configuration data, and wherein the method includes receiving request response data associated to the request, the request response data being generated by the resource interface. A4. The method of A1, wherein the request is a live production request from a requesting client computer, and wherein the method includes receiving request response data associated to the request, the request response data being generated by the production environment resource. A5. The method of A1, wherein the request is a synthetic request initiated based on administrator user defined configuration data, and wherein the method includes receiving request response data associated to the request, the request response data being generated by the production environment resource. A6. The method of A1, wherein the method includes marking of a second request to define a second marked request that includes associated second metadata, wherein the second metadata specifies second action for performing by the resource interface associated to the production, and sending the second marked request to the resource interface for performance of the action specified by the metadata, wherein the second action is different from the action. A7. The method of A1, wherein the method includes marking of a second request to define a second marked request that includes associated second metadata, wherein the second metadata specifies that the second request is a synthetic request and wherein the metadata specifies that the request is a live production request. A8. The method of A1, wherein the action specified by the metadata includes action for causing the resource interface to store live production response data generated by the production environment into a data store associated to the resource interface, the live production response data being generated in response to the request, wherein the live production response data stored in the data store configures the resource interface to provide the emulating functionality. B1. A method comprising: receiving at a resource interface a request, the request being a marked request having metadata that specifies action for the resource interface, wherein the resource interface is associated to a production environment resource, and wherein the resource interface is configured for emulating functionality of its associated resource interface; and performing the action specified in the metadata. B2. The method of B1, wherein the action specified by the metadata includes action for causing the resource interface to store live production response data generated by the production environment into a data store associated to the resource interface, the live production response data being generated in response to the request, wherein the live production response data stored in the data store configures the resource interface to provide the emulating functionality. B3. The method of B1, wherein the method includes receiving at the resource interface a second request, the second request including associated second metadata, wherein the second metadata specifies second action for performing by the resource interface associated to the production environment resource, wherein the second action is different from the action. B4. The method of B1, wherein the method includes receiving at the resource interface a second request, the second request including associated second metadata, wherein the second metadata specifies a second action for performing by the resource interface associated to the production environment resource, wherein the second action is different from the action, wherein the method includes performing the second action, wherein the action includes the resource interface emulating functionality of the production environment resource, wherein the second action includes the resource interface passthrough forwarding the second request to the production environment resource for execution by the production environment resource. B5. The method of B1, wherein the method includes receiving at the resource interface a second request, the second request having associated second metadata, wherein the second metadata specifies that the second request is a synthetic request and wherein the metadata specifies that the request is a live production request. B6. The method of B1, wherein the request is a live production request from a requesting client computer, and wherein the performing the action includes the resource interface emulating a response to the request by the production environment resource. B7. The method of B1, wherein the request is a synthetic request initiated based on administrator user defined configuration data, and wherein the performing the action includes the resource interface emulating a response to the request by the production environment resource. B8. The method of B1, wherein the request is a live production request from a requesting client computer, and wherein the performing the action includes the resource interface passthrough forwarding the request to the production environment resource for execution by the production environment resource. B9. The method of B1, wherein the request is a synthetic request initiated based on administrator user defined configuration data, and wherein the performing the action includes the resource interface passthrough forwarding the request to the production environment resource for execution by the production environment resource. C1. A computer program product comprising: a computer readable storage medium readable by one or more processing circuit and storing instructions for execution by one or more processor for performing a method, the method including: marking of a request to define a marked request that includes associated metadata, wherein the metadata specifies action for performing by a resource interface associated to a production environment resource of a production environment, wherein the resource interface is configured for emulating functionality of the production environment resource; and sending the marked request to the resource interface for performance of the action specified by the metadata. C2. The computer program product of C1, wherein the request is a live production request from a requesting client computer, and wherein the method includes receiving request response data associated to the request, the request response data being generated by the resource interface. C3. The computer program product of C1, wherein the request is a synthetic request initiated based on administrator user defined configuration data, and wherein the method includes receiving request response data associated to the request, the request response data being generated by the resource interface.

Certain embodiments herein may offer various technical computing advantages, involving computing advantages to address problems arising in the realm of computer networks. Embodiments herein can feature a production environment which can process both live production requests and synthetic requests to alleviate a need for reliance on a shadow environment and additional hardware infrastructure for testing of a production environment. Embodiments herein can provide for sampling of response data of a production environment resource with live or synthetic requests. Embodiments herein for improved testing of a production environment by facilitating processing of both live production requests and synthetic requests in a production environment. Embodiments herein provide for a resource interface that can emulate the functionality of a resource associated to the resource interface. Embodiments herein provide for training of a resource interface via iterative sampling so that the resource interface is capable of emulating operation of its associated resource and further so that emulation capabilities are iteratively updated. Embodiments herein for improved testing operations and diagnosis of potential risks facilitate processing of a live production request by a production environment resource and/or by a resource interface associated to the production environment resource. For providing improved testing and risk diagnosis, embodiments herein can facilitate the processing of a synthetic request by a production environment resource and/or by a resource interface associated to the resource that emulates the functionality of the resource. Embodiments herein provide for a process that simulates failure of one or more resource of a production environment. Embodiments herein feature low overhead processing. Embodiments herein provide for disabling of features by distribution of a disabling command that disables metadata marking and examining operations.

Figure 11:
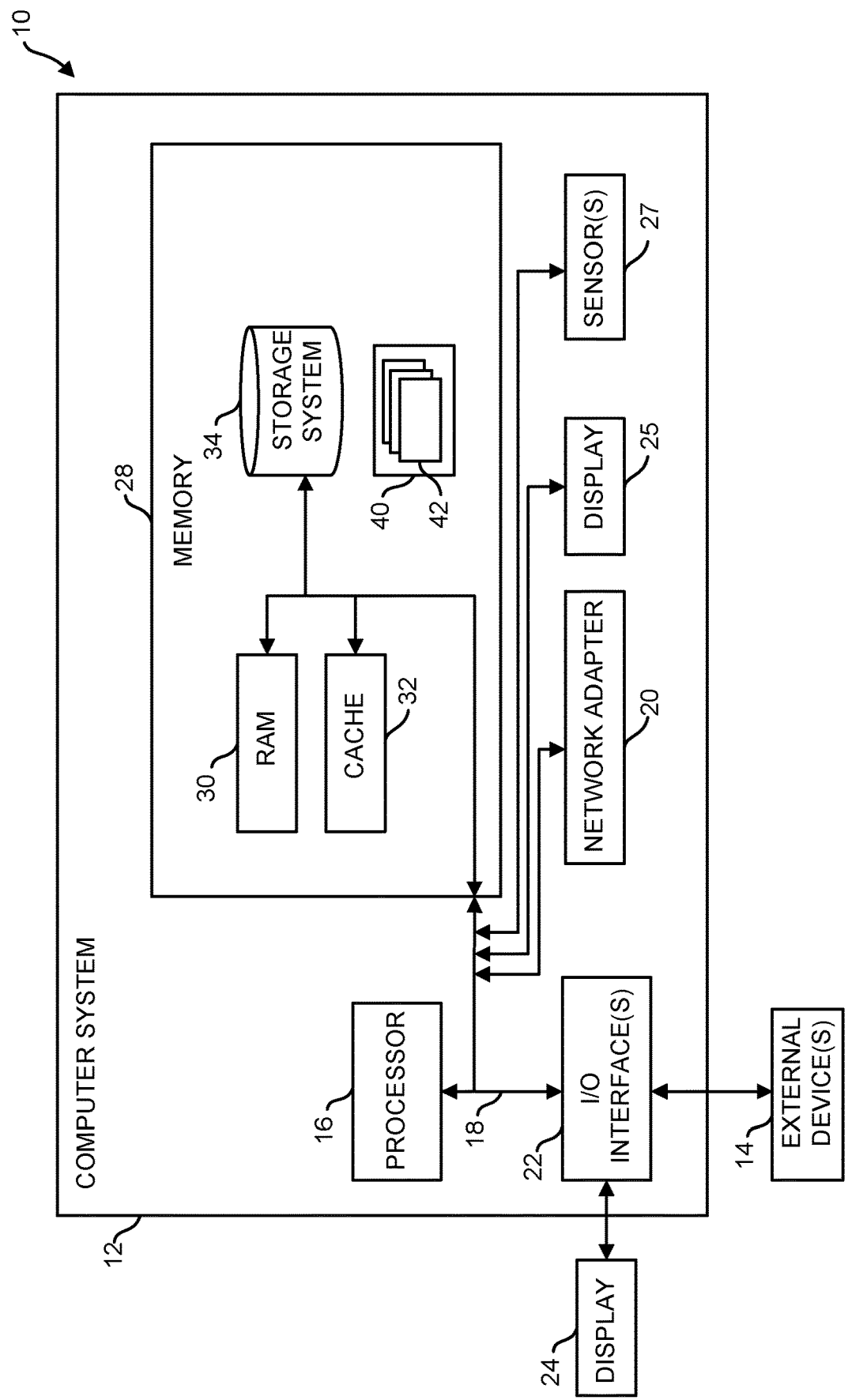
FIG. 11 depicts a computing node according to one embodiment.
Figure 12:
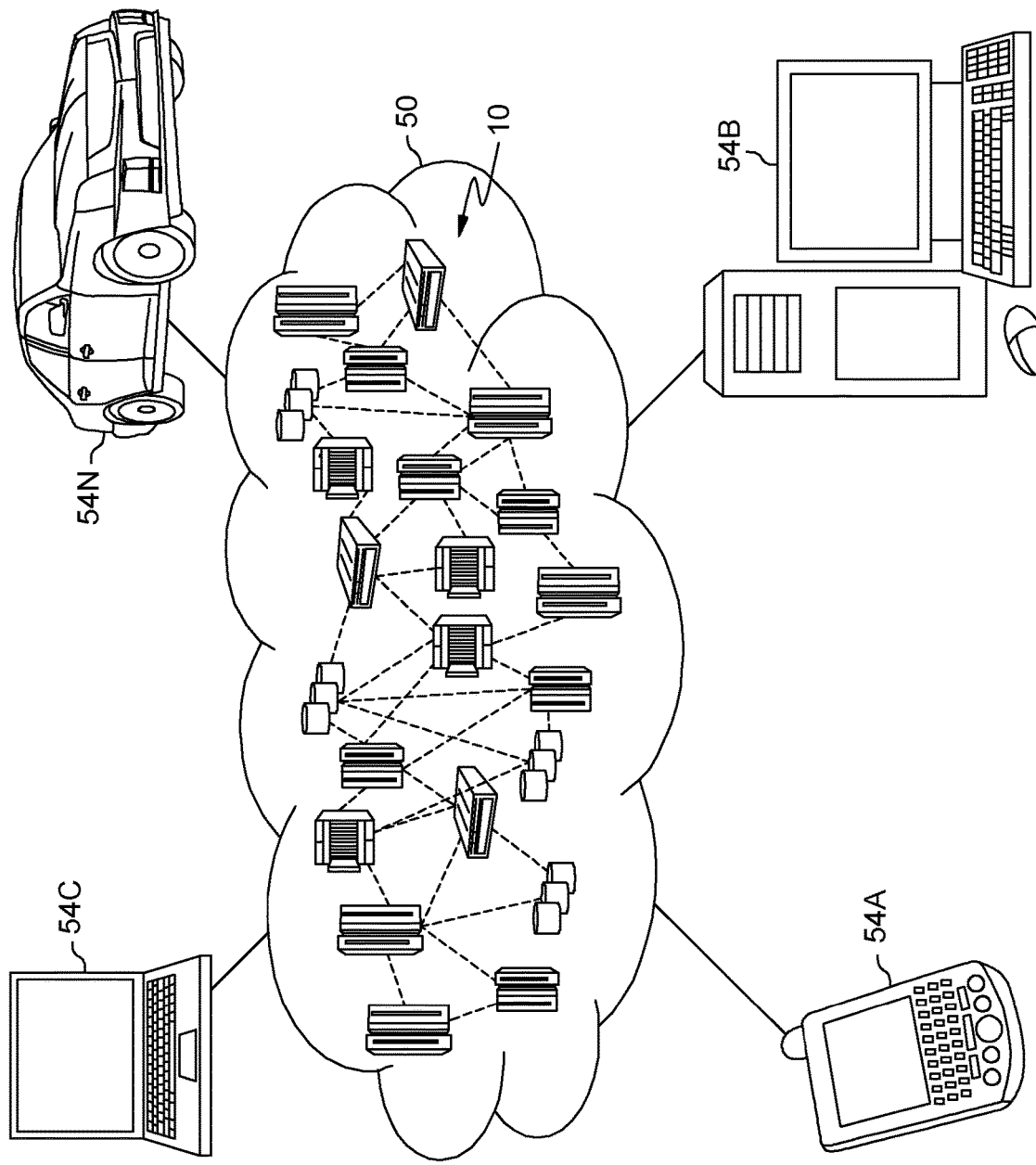
FIG. 12 depicts a cloud computing environment according to one embodiment.
Figure 13:
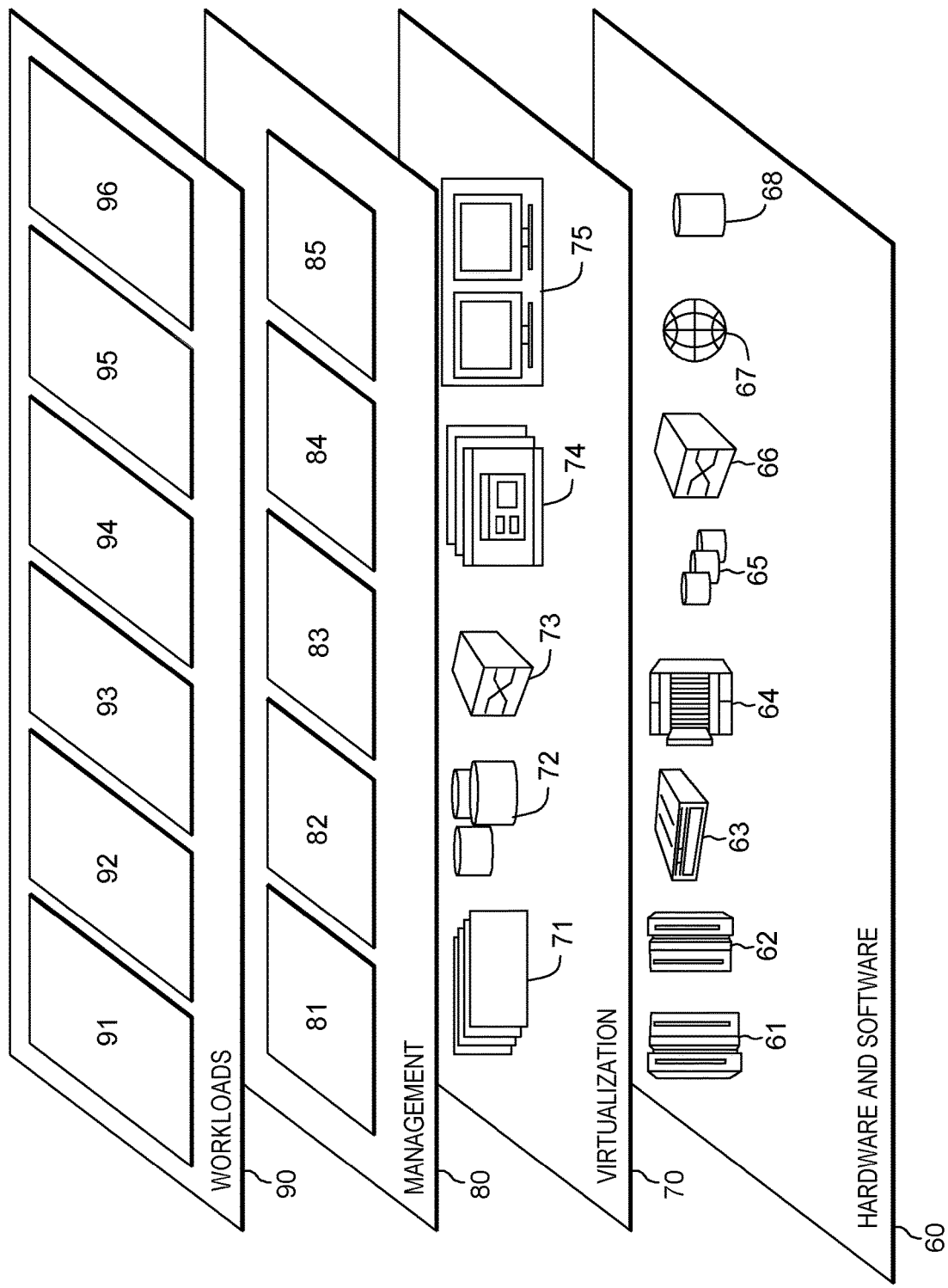
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, interceptor system 110 can include one or more computing node 10 and can include one or more program 40 for performing functions described with reference to method 200 of the flowchart of FIG. 2A and/or the functions attributed to interceptor system 110 described in reference to the flowcharts of FIGS. 3-8. In one embodiment, resource interfaces 1500A-1500Z can each include one or more computing node 10 and can each include one or more program 40 for performing functions described with reference to method 250 of the flowchart of FIG. 2B and/or the functions attributed to resource interfaces 1500A-1500Z described in reference to the flowcharts of FIGS. 3-8. In one embodiment, administrator client computer 130 can include one or more computing node 10 and can include one or more program 40 for performing functions attributed to administrator client computer 130 described in reference to the flowcharts of FIGS. 3-8. In one embodiment each component described with reference to FIG. 1 can include one or more computing node 10 and can inlcude one or more program 40 for providing the functions attributed to the component.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing of synthetic and live production requests in a live production environment as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   marking of a request to define a marked request that includes metadata, wherein the metadata specifies action for performing by a resource interface associated to a production environment resource of a production environment, wherein the resource interface is configured for emulating functionality of the production environment resource, wherein the resource interface is configured for processing synthetic requests and live production requests;
   sending the marked request to the resource interface for performance of the action specified by the metadata;
   receiving at the resource interface the request having the metadata that specifies action for the resource interface associated to a production environment resource of a production environment; and
   performing the action specified in the metadata.

2. The method of claim 1, wherein the request is a live production request from a requesting client computer, and wherein the method includes receiving request response data associated to the request, the request response data being generated by the resource interface.

3. The method of claim 1, wherein the request is a synthetic request initiated based on administrator user defined configuration data, and wherein the method includes receiving request response data associated to the request, the request response data being generated by the resource interface.

4. The method of claim 1, wherein the request is a live production request from a requesting client computer, and wherein the method includes receiving request response data associated to the request, the request response data being generated by the production environment resource.

5. The method of claim 1, wherein the request is a synthetic request initiated based on administrator user defined configuration data, and wherein the method includes receiving request response data associated to the request, the request response data being generated by the production environment resource.

6. The method of claim 1, wherein the action specified by the metadata includes action for causing the resource interface to store live production response data generated by the production environment into a data store associated to the resource interface, the live production response data being generated in response to the request, wherein the live production response data stored in the data store configures the resource interface to provide the emulating functionality.

7. A method comprising:
   marking of a request to define a marked request that includes associated metadata, wherein the metadata specifies action for performing by a resource interface associated to a production environment resource of a production environment, wherein the resource interface is configured for emulating functionality of the production environment resource, and wherein the resource interface and the production environment resource have a common address;
   sending the marked request to the resource interface for performance of the action specified by the metadata; and
   performing the action specified in the metadata.

8. The method of claim 7, wherein the request is a synthetic request initiated based on administrator user defined configuration data, and wherein the method includes receiving request response data associated to the request, the request response data being generated by the resource interface.

9. The method of claim 7, wherein the marking is performed so that the metadata specifies second action for performing by the resource interface associated to the production environment resource, wherein the action includes the resource interface emulating functionality of the production environment resource in processing the request, wherein the second action includes the resource interface forwarding the request to the production environment resource for executing by the production environment resource, wherein the method includes subjecting response data of the resource interface resulting from the emulating functionality of the production environment resource in processing the request, and response data of the production environment resource resulting from the executing by the production environment resource to dissimilarity processing, and ascertaining an emulation capability of the resource interface in dependence on the dissimilarity processing.

10. The method of claim 1, wherein the method includes marking of a second request to define a second marked request that includes associated second metadata, wherein the second metadata specifies second action for performing by the resource interface associated to the production environment, and sending the second marked request to the resource interface for performance of the action specified by the metadata, wherein the second action is different from the action, wherein the action includes the resource interface emulating functionality of the production environment resource in processing the request, wherein the second action includes the resource interface passthrough forwarding the second request to the production environment resource for execution by the production environment resource.

11. The method of claim 1, wherein the method includes marking of a second request to define a second marked request that includes associated second metadata, wherein the request is a synthetic request, and wherein the second request is a synthetic request, wherein the second metadata specifies second action for performing by the resource interface associated to the production environment, and sending the second marked request to the resource interface for performance of the action specified by the metadata, wherein the second action is different from the action, wherein the action includes the resource interface emulating functionality of the production environment resource in processing the request, wherein the second action includes the resource interface passthrough forwarding the second request to the production environment resource for execution by the production environment resource.

12. The method of claim 1, wherein the production environment resource is a database, wherein the method includes marking of a second request to define a second marked request that includes associated second metadata, wherein the request is a synthetic request, and wherein the second request is a synthetic request, wherein the second metadata specifies second action for performing by the resource interface associated to the production environment, and sending the second marked request to the resource interface for performance of the action specified by the metadata, wherein the second action is different from the action, wherein the action includes the resource interface emulating functionality of the production environment resource in processing the request, wherein the second action includes the resource interface passthrough forwarding the second request to the production environment resource for execution by the production environment resource.

13. The method of claim 1, wherein the marking is performed so that the metadata specifies second action for performing by the resource interface associated to the production environment resource, wherein the action includes the resource interface emulating functionality of the production environment resource in processing the request, wherein the second action includes the resource interface forwarding the request to the production environment resource for executing by the production environment resource.

14. The method of claim 1, wherein the marking is performed so that the metadata specifies second action for performing by the resource interface associated to the production environment resource, wherein the action includes the resource interface emulating functionality of the production environment resource in processing the request, wherein the second action includes the resource interface forwarding the request to the production environment resource for executing by the production environment resource, wherein the method includes subjecting response data of the resource interface resulting from the emulating functionality of the production environment resource in processing the request, and response data of the production environment resource resulting from the executing by the production environment resource to dissimilarity processing, and ascertaining an emulation capability of the resource interface in dependence on the dissimilarity processing.

15. The method of claim 7, wherein the production environment resource is a production environment database resource.

16. The method of claim 7, wherein the request is a live production request from a requesting client computer, and wherein the method includes receiving request response data associated to the request, the request response data being generated by the resource interface.

17. A computer program product comprising:
a computer readable storage medium readable by one or more processing circuit and storing instructions for execution by one or more processor for performing a method, the method including:
marking of a request to define a marked request that includes metadata, wherein the metadata specifies action for performing by a resource interface associated to a production environment resource of a production environment, wherein the resource interface is configured for emulating functionality of the production environment resource, wherein the resource interface is configured for processing synthetic requests and live production requests;
sending the marked request to the resource interface for performance of the action specified by the metadata;
receiving at the resource interface the request having the metadata that specifies action for the resource interface associated to a production environment resource of a production environment; and
performing the action specified in the metadata.

18. The computer program product of claim 17, wherein the request is a live production request from a requesting client computer, and wherein the method includes receiving request response data associated to the request, the request response data being generated by the resource interface.

19. The computer program product of claim 17, wherein the request is a synthetic request initiated based on administrator user defined configuration data, and wherein the method includes receiving request response data associated to the request, the request response data being generated by the resource interface.

20. The computer program product of claim 17, wherein the request is a live production request from a requesting client computer, and wherein the method includes receiving request response data associated to the request, the request response data being generated by the production environment resource.

* * * * *